US011964374B2

(12) United States Patent
Fish et al.

(10) Patent No.: US 11,964,374 B2
(45) Date of Patent: Apr. 23, 2024

(54) STAPLER WITH MOVEABLE STRIKE PLATE AND INTEGRATED ACCESSIBILITY FEATURES

(71) Applicant: WORKLIFE BRANDS LLC, Framingham, MA (US)

(72) Inventors: Robert Fish, Worcester, MA (US); Marc Senger, Weymouth, MA (US); Michael McDuffee, Gloucester, MA (US); Ben Beck, Boston, MA (US); John Swain, St. Paul, MN (US); Nicole Nassif, Mansfield, MA (US)

(73) Assignee: WORKLIFE BRANDS LLC, Framingham, MA (US)

( * ) Notice: Subject to any disclaimer, the term of this patent is extended or adjusted under 35 U.S.C. 154(b) by 0 days.

(21) Appl. No.: 17/984,182

(22) Filed: Nov. 9, 2022

(65) Prior Publication Data

US 2023/0066164 A1 Mar. 2, 2023

Related U.S. Application Data

(62) Division of application No. 16/782,766, filed on Feb. 5, 2020, now Pat. No. 11,524,397.

(51) Int. Cl.
*B25C 5/02* (2006.01)

(52) U.S. Cl.
CPC ............ *B25C 5/0292* (2013.01); *B25C 5/025* (2013.01); *B25C 5/0278* (2013.01)

(58) Field of Classification Search
CPC ......... B25C 5/00; B25C 5/0295; B25C 5/025; B25C 5/0278
See application file for complete search history.

(56) References Cited

U.S. PATENT DOCUMENTS

| | | | |
|---|---|---|---|
| 2,251,833 | A | 8/1941 | Fridolin et al. |
| 3,278,101 | A | 10/1966 | Yasuzo |
| 3,563,513 | A | 2/1971 | Rubin et al. |

(Continued)

FOREIGN PATENT DOCUMENTS

| | | |
|---|---|---|
| CA | 2550386 | 12/2006 |
| CN | 2536359 | 2/2003 |

(Continued)

OTHER PUBLICATIONS

Office Action for U.S. Appl. No. 16/782,766, dated Sep. 7, 2021, 6 pages. Restriction Requirement.

(Continued)

*Primary Examiner* — Chelsea E Stinson
(74) *Attorney, Agent, or Firm* — Sheridan Ross P.C.

(57) ABSTRACT

A stapler including a moveable strike plate and accessibility features is described. A slidable strike plate is moveable from a first staple forming position to a second staple forming position to form different staple shapes. The slidable strike plate is moved relative to the anvil of the stapler with a single hand to change positions. A rotatable strike plate is turned with a single hand to move between staple forming positions by rotating an outer dial of the rotatable strike plate relative to the anvil of the stapler. The stapler includes an indicator window that shows if the stapler is empty or running low on staples and a quick release staple loading magazine that is operable using a single hand.

20 Claims, 17 Drawing Sheets

(56) References Cited

U.S. PATENT DOCUMENTS

| | | | | |
|---|---|---|---|---|
| 3,630,428 | A * | 12/1971 | Olney | B25C 5/025 227/128 |
| 4,227,638 | A | 10/1980 | Medina et al. | |
| 4,405,073 | A | 9/1983 | Salleras | |
| 4,619,392 | A | 10/1986 | Won | |
| 5,004,142 | A | 4/1991 | Olesen | |
| 5,413,266 | A | 5/1995 | Jairam | |
| 5,507,425 | A | 4/1996 | Ziglioli | |
| 5,690,268 | A | 11/1997 | Evans et al. | |
| 5,797,535 | A | 8/1998 | Lovegrove et al. | |
| 5,967,397 | A | 10/1999 | Fealey | |
| D416,774 | S * | 11/1999 | Huang | D8/50 |
| D465,139 | S * | 11/2002 | Robillard | D19/72 |
| 6,494,356 | B1 | 12/2002 | Frank et al. | |
| 6,676,002 | B2 | 1/2004 | Jairam et al. | |
| 6,925,849 | B2 | 8/2005 | Jairam | |
| 7,124,924 | B2 | 10/2006 | Marks | |
| 7,290,694 | B2 | 11/2007 | Kirby et al. | |
| 7,311,236 | B2 | 12/2007 | Smith et al. | |
| 7,549,561 | B2 | 6/2009 | Kirby et al. | |
| 7,571,843 | B2 | 8/2009 | Kumayama | |
| 7,614,537 | B2 | 11/2009 | Andersson et al. | |
| 7,681,771 | B2 | 3/2010 | Kandasamy et al. | |
| 8,186,552 | B2 | 5/2012 | Huang | |
| 9,592,597 | B2 | 3/2017 | Marks | |
| 11,524,397 | B2 | 11/2022 | Fish et al. | |
| 2006/0144894 | A1* | 7/2006 | Kirby | B25C 5/1613 227/134 |
| 2007/0158382 | A1 | 7/2007 | Zins et al. | |
| 2008/0308596 | A1 | 12/2008 | Gardner | |
| 2011/0079625 | A1* | 4/2011 | Huang | B25C 5/0207 227/120 |
| 2017/0182645 | A1* | 6/2017 | Marks | B25C 5/0228 |
| 2018/0117750 | A1 | 5/2018 | Thiyagarajan | |

FOREIGN PATENT DOCUMENTS

| | | |
|---|---|---|
| CN | 101218071 | 7/2008 |
| CN | 201214324 | 4/2009 |
| CN | 201970279 | 9/2011 |
| CN | 202498518 | 10/2012 |
| CN | 202607610 | 12/2012 |
| CN | 102896615 | 1/2013 |
| CN | 104175289 | 12/2014 |
| CN | 108326800 | 7/2018 |

OTHER PUBLICATIONS

Office Action for U.S. Appl. No. 16/782,766, dated Jan. 28, 2022, 19 pages.

Office Action for U.S. Appl. No. 16/782,766, dated May 12, 2022, 9 pages.

Notice of Allowance for U.S. Appl. No. 16/782,766, dated Aug. 9, 2022, 9 pages.

* cited by examiner

STAPLER WITH MOVEABLE STRIKE PLATE AND INTEGRATED ACCESSIBILITY FEATURES

CROSS-REFERENCE TO RELATED APPLICATIONS

The present application is a division of U.S. patent application Ser. No. 16/782,766, filed on Feb. 5, 2020, entitled "Stapler with Moveable Strike Plate and Integrated Accessibility Features," the entire disclosure of which is hereby incorporated herein by reference, in its entirety, for all that it teaches and for all purposes.

FIELD

The present disclosure is generally directed to a stapler, and in particular a stapler with a moveable strike plate and integrated accessibility features.

BACKGROUND

Staples offer an inexpensive and unobtrusive option in temporarily, or even permanently, holding papers together. Some staples are made from a number of wires that are joined together (e.g., glued, etc.) to form a flat semi-continuous strip of material. This strip of material can then be fed into a machine where it is cut to a specific size and then bent into a U-shaped group of staples. These groups of staples are finished, packaged, and then sold for use in staplers.

Staplers receive the finished group of staples (e.g., in a carrier) and hold the staples until the stapler is actuated. During operation, a hammer inside the stapler moves into contact with a crown of an individual staple in the group of staples, separates the staple from the group, and forces the staple through a stack of papers, or other media to be stapled together. Once the staple has passed through the stack of papers, the movement of the hammer against the crown forces the legs of the staple against a forming area of a strike plate and anvil in the base of the stapler. Depending on the type of fastening desired, a user may change the final form of the staple between an inwardly clinching staple style and an outwardly clinching staple style. In general, an outwardly clinching form of a staple is a less permanent form for the staple than the inwardly clinching form. Essentially, the outwardly clinching form of a staple pins pages together allowing a user to easily remove the staple without tearing the papers.

As can be appreciated, some staplers may include an anvil with both the inwardly clinching and the outwardly clinching forming features disposed therein. Switching between these different forming styles in a conventional stapler, however, generally requires use of both hands and, in some cases, the use of tools.

Once a stapler has ejected all of the staples in a group, the stapler must be reloaded. Reloading a stapler generally requires a user to place one hand on the base holding the stapler stable while, using the other hand, pivoting the handle from a closed position into an open position to expose the carrier. In some cases, a user may made aware that a stapler is out of staples only after attempting to staple a stack of papers and realizing that no staple has been ejected. As a result, the frustrated user is required to stop working and take the requisite amount of time to reload the stapler.

BRIEF SUMMARY

It is with respect to the above issues and other problems that the embodiments presented herein were contemplated. In general, embodiments of the present disclosure provide a stapler including an easily moveable strike plate that allows a user to switch between staple forming types using one hand. In one embodiment, the stapler may include a slidable strike plate that, when moved relative to the staple ejection area, positions the features associated with a desired staple forming type beneath the staple ejection area. It is an aspect of the present disclosure that the slidable strike plate may be moved from one position to another using only one hand. In some embodiments, the stapler may include a rotatable strike plate shaped like a dial and having a grip surface disposed on an outer surface of the dial. The rotatable strike plate may be rotated (e.g., either clockwise or counterclockwise) about a center axis of the dial to position the features of a desired staple forming type beneath the staple ejection area. The rotatable strike plate may be rotated from one position to another using only one hand and without requiring the stapler to be physically picked up. The moveable strike plates disclosed herein may include one or more detents associated with each position (e.g., forming type) that allow the features associated with a desired staple forming type to accurately located in position for stapling.

In some embodiments, the staplers described herein may comprise at least one indicator window disposed in a portion of the carrier. The indicator window may be used to quickly determine whether any staples are in the carrier of the stapler. For instance, the indicator window may pass from an outside of the stapler to an interior compartment of the stapler. The interior compartment may correspond to a staple receiving cavity. The indicator window may be disposed near, or adjacent to, a front end of the stapler. As staples are ejected from the stapler, a pusher may become visible in the indicator window (e.g., indicating that the stapler is about to run out of staples). Once the pusher fills an entirety of the indicator window, it may be determined that the stapler is empty and needs to be reloaded, or refilled. In some embodiments, the pusher may be colored (e.g., red, green, orange, blue, etc.) with a contrasting color to the color of the carrier so a user can easily identify whether the stapler is empty or not.

The staplers described herein may include a number of additional accessibility features, or features that provide additional functionality and ease of use to a user. In one embodiment, the stapler may include a quick release magazine. For instance, by depressing a release button, the magazine may eject a distance from the front of the stapler and the carrier providing access to the staple receiving cavity. While in this loading position, a user can drop a group of staples into the staple receiving cavity and then close the magazine by pushing the end of the magazine toward the rear of the stapler (e.g., until the magazine engages with a latching mechanism associated with the release button, etc.). Moving the magazine from the operating position to the loading position, and vice versa, can be performed using only a single hand.

In some embodiments, the staplers described herein may include one or more integrated storage compartments or areas. For example, the stapler may comprise additional staple storage in the form of a tray that can be pulled, at least partially, from the handle of the stapler. In one embodiment, the stapler may include a recessed area that holds a staple remover. This staple remover may be pulled from the base and reengaged with the base using magnets, ball detents, and/or other positive location features.

BRIEF DESCRIPTION OF THE DRAWINGS

The accompanying drawings are incorporated into and form a part of the specification to illustrate several examples of the present disclosure. These drawings, together with the description, explain the principles of the disclosure. The drawings simply illustrate preferred and alternative examples of how the disclosure can be made and used and are not to be construed as limiting the disclosure to only the illustrated and described examples. Further features and advantages will become apparent from the following, more detailed, description of the various aspects, embodiments, and configurations of the disclosure, as illustrated by the drawings referenced below.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Figure 1A:
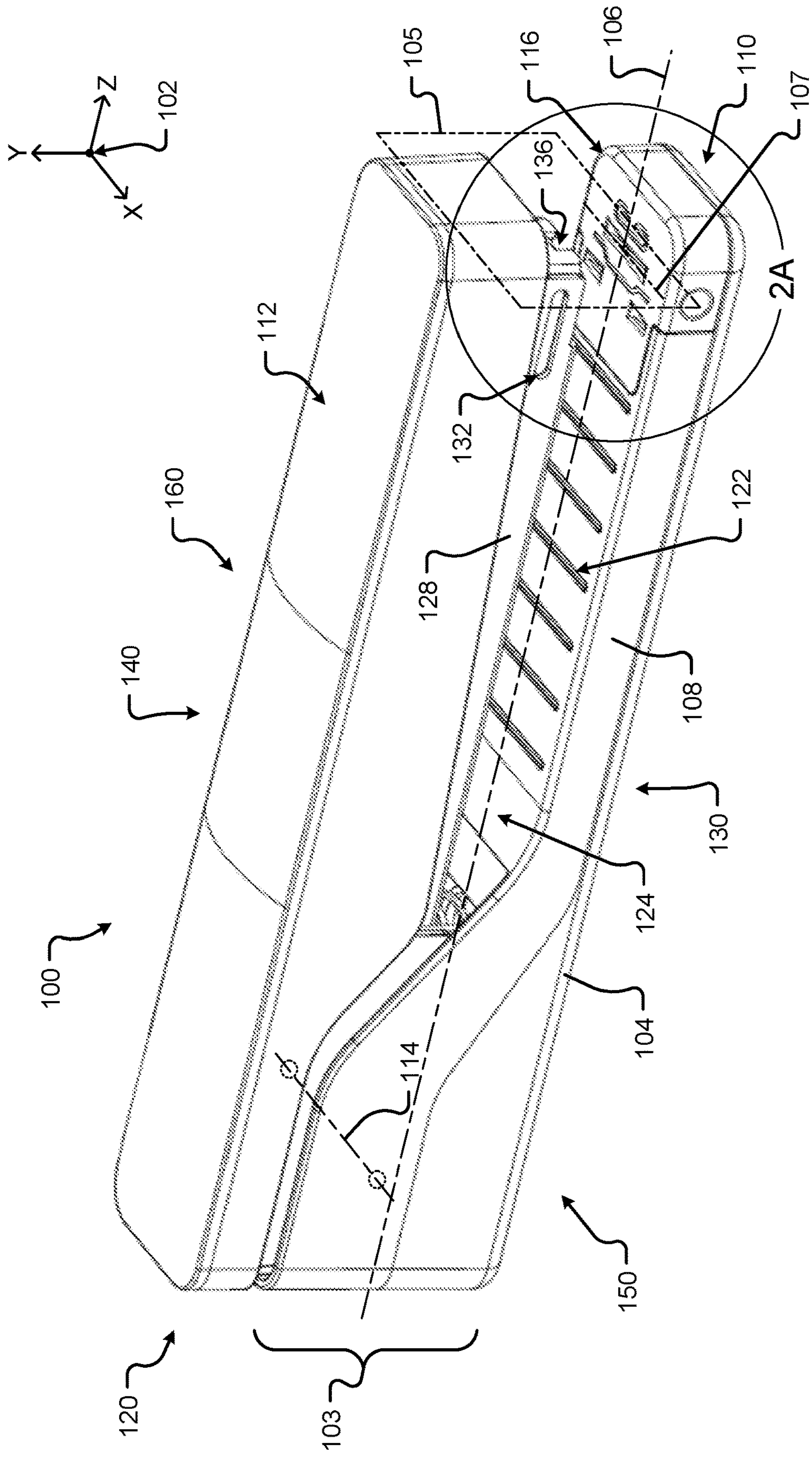
FIG. 1A shows a front perspective view of a stapler with a slidable strike plate in accordance with embodiments of the present disclosure.
Figure 4A:
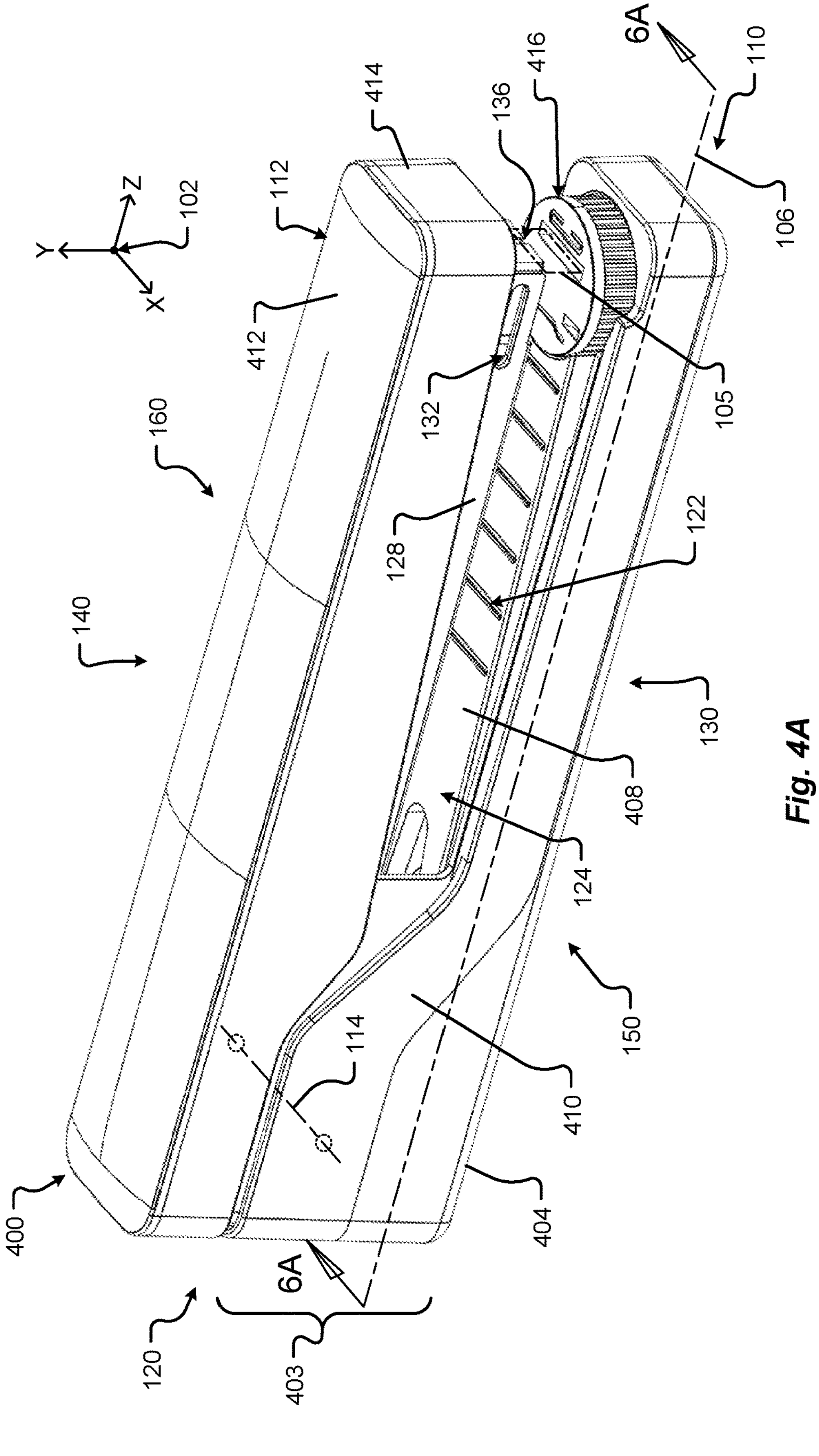
FIG. 4A shows a front perspective view of a stapler with a rotatable strike plate in accordance with embodiments of the present disclosure.

In some embodiments, reference may be made to dimensions, angles, directions, relative positions, and/or movements associated with one or more components of a stapler 100, 400 with respect to a coordinate system 102. The coordinate system 102, as shown in the accompanying figures, includes three-dimensions comprising an X-axis, a Y-axis, and a Z-axis. Additionally or alternatively, the coordinate system 102 may be used to define planes (e.g., the XY-plane, the XZ-plane, and the YZ-plane) of the stapler 100, 400. These planes may be disposed orthogonal, or at 90 degrees, to one another. While the origin of the coordinate system may be placed at any point on or near the stapler 100, 400 for the purposes of description, the axes of the coordinate system 102 are always disposed along the same directions from figure to figure. As shown in FIG. 1A, the length of the stapler 100 may be defined as the dimension along the Z-axis, the height of the stapler 100 may be defined as the dimension along the Y-axis, and the width of the stapler 100 may be defined as the dimension along the X-axis. Similarly, as shown in FIG. 4A, the length of the stapler 400 may be defined as the dimension along the Z-axis, the height of the stapler 400 may be defined as the dimension along the Y-axis, and the width of the stapler 400 may be defined as the dimension along the X-axis. Additionally or alternatively, the directionality of the X-axis, Y-axis, and Z-axis may be flipped, as noted with negative directionality (i.e., the negative X-axis direction is the opposite direction of the X-axis direction). Other dimensions, angles, and relative positions of the one or more components of the stapler 100, 400 may be as described herein.

Figure 1B:
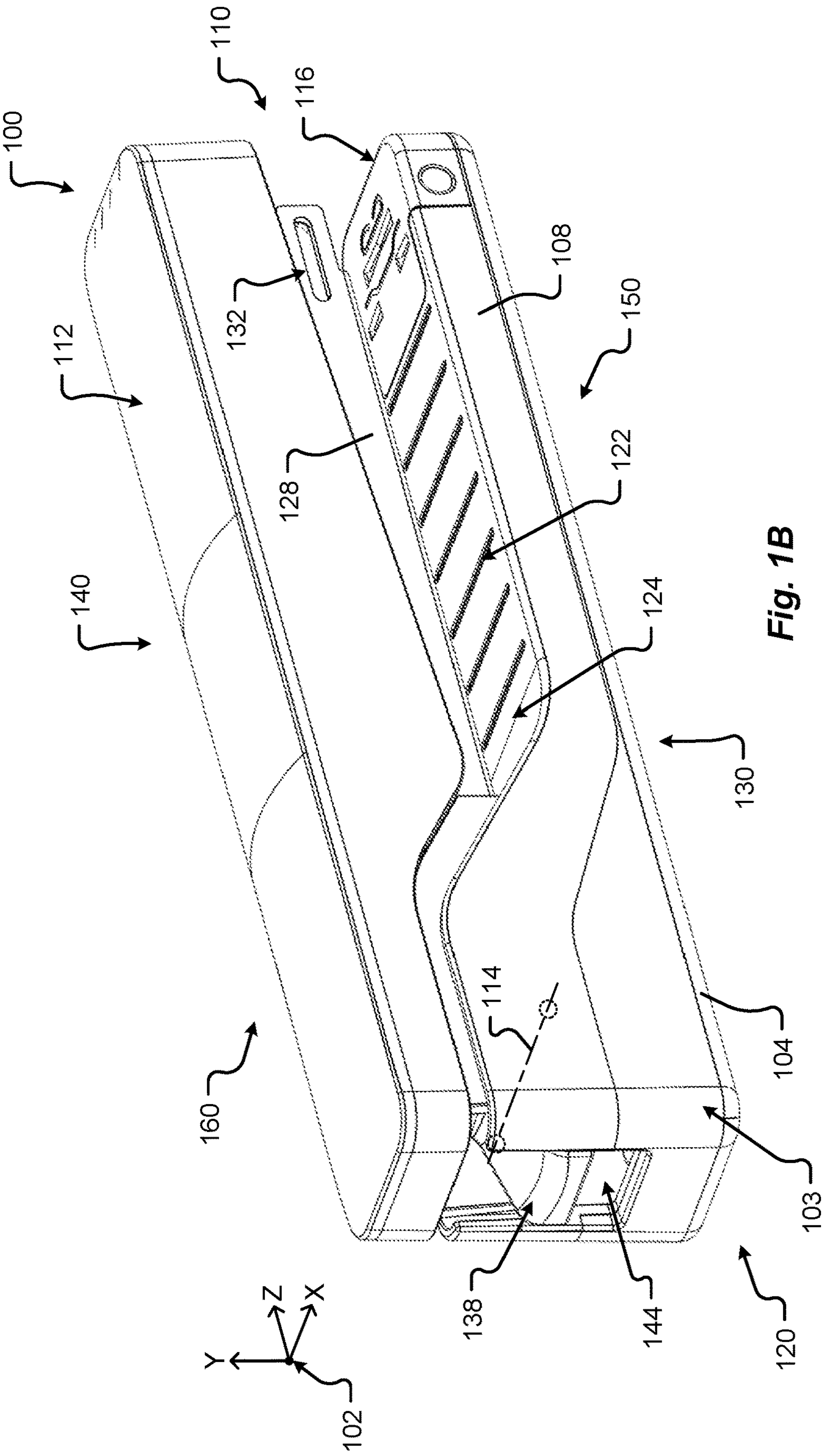
FIG. 1B shows a rear perspective view of the stapler shown in FIG. 1A.
Figure 1C:
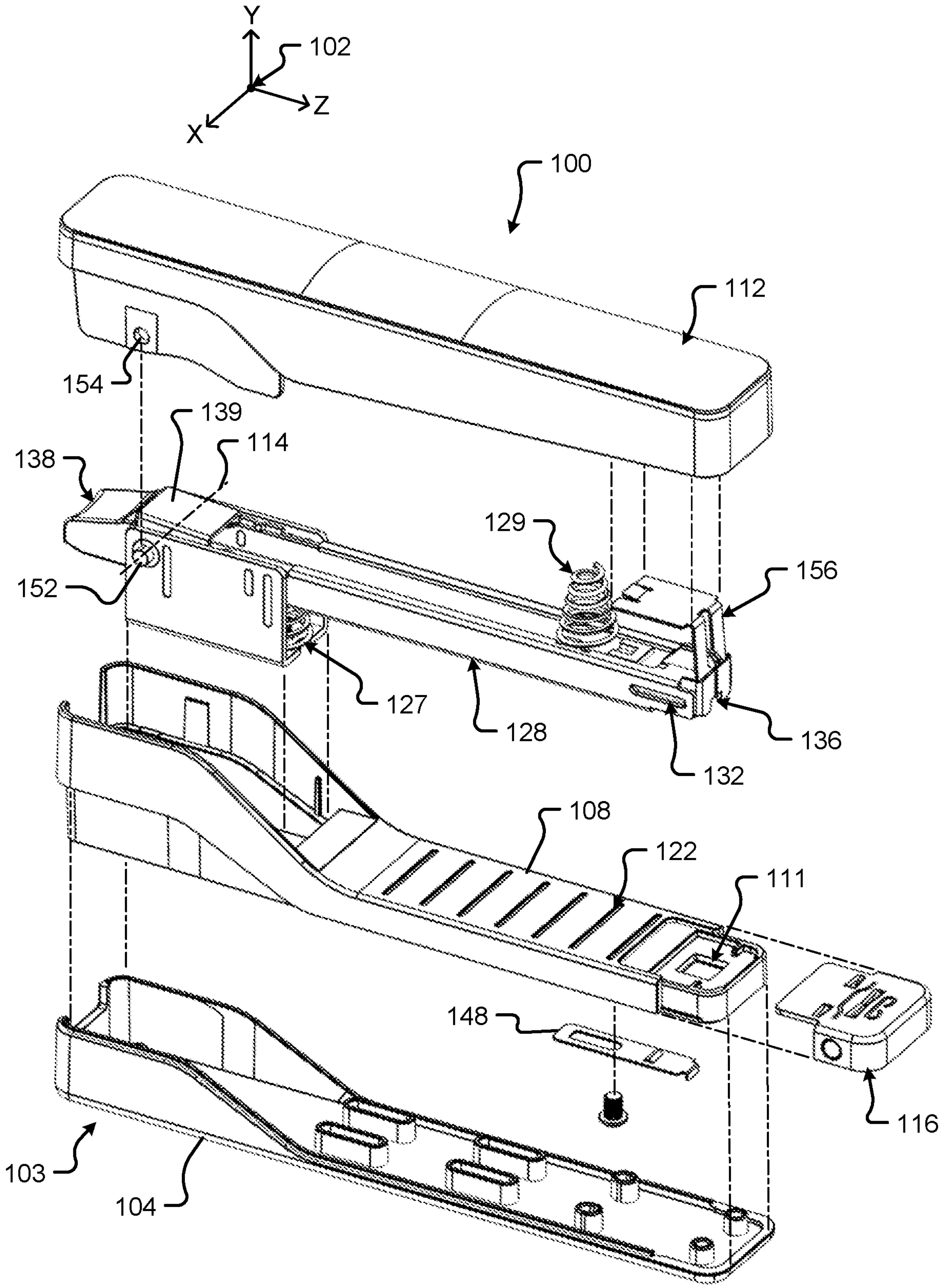
FIG. 1C shows an exploded front perspective view of the stapler shown in FIG. 1A.

Referring to FIGS. 1A-1C, various views of a stapler 100 are shown in accordance with embodiments of the present disclosure. The stapler 100 shown in FIGS. 1A-1C may comprise a slidable strike plate 116. The slidable strike plate 116 may be moved from a retracted position (e.g., associated with a first staple forming type) to an extended position (e.g., associated with a second staple forming type). The stapler 100 may comprise a base 103 (e.g., including a foot 104 and an anvil 108), a handle 112, and a carrier 128. In some embodiments, the handle 112 may comprise the carrier 128 and may pivot relative to the base 103 (e.g., about a pivot axis 114). In some embodiments, as the handle 112 pivots, a portion of the carrier 128 may be moved closer toward the slidable strike plate 116.

The base 103 of the stapler 100 may correspond to one or more cast, formed, molded, and/or machined parts. In some embodiments, the base 103 may comprise one or more components made from plastic, rubber, metal, and/or combinations thereof. In one embodiment, the base 103 may be made from an injection molded plastic component and/or may be coated with a high-friction surface treatment. For instance, the base 103 may be coated with a rubber grip surface. Additionally or alternatively, the base 103 may include a foot 104 disposed on a bottom-most portion of the stapler 100. The foot 104 may be made from rubber and/or include a rubberized (e.g., coated, deposited, and/or formed) surface. In any event, a rubber, or rubber-like, material can offer stability during use and prevent movement of the stapler 100 as the handle 112 is actuated relative to the base 103.

In some embodiments, a stapling plane 105 may be disposed in a plane running orthogonal to the length of the stapler 100. For instance, the stapling plane 105 of the stapler 100 may be disposed in, or parallel to, the XY-plane with reference to the coordinate system 102 shown in FIG. 1A. The stapling plane 105 of the stapler 100 may define a staple ejection path that staples follow when ejected from the stapler 100. As the legs of an ejected staple reach an upper surface of the slidable strike plate 116 (e.g., illustrated at line 107), the ejected staple may enter at least one recess configured to form the ejected staple into a particular shape (e.g., an inwardly clinching form, an outwardly clinching form, etc.). As shown in FIG. 1A, the line 107 lies in the stapling plane 105 of the stapler 100. In some embodiments, the stapling plane 105 is fixed (e.g., unmoving) at a distance measured from the front 110, rear 120, and/or the pivot axis 114 of the stapler 100.

The anvil 108 may correspond a cast, formed, molded, and/or machined part. In some embodiments, the anvil 108 may be made from plastic, rubber, metal, and/or combinations thereof. In one embodiment, the anvil 108 may be made from a metal such as iron, steel, aluminum, etc., and/or combinations or alloys thereof. The anvil 108 may include a number of features that support, contain, and/or limit movement of the slidable strike plate 116. The anvil 108 may include a number of page edge guides 122. The page edge guides 122 may correspond to a scored, grooved, machined, formed, or otherwise marked surface of the anvil 108. The page edge guides 122 may be spaced apart according to a gradation, or measurement increment. In some embodiments, the page edge guides 122 may allow a user to align an edge of a stack of papers prior to stapling. Among other things, the page edge guides 122 may allow a user to repeatably staple stacks of papers at the same location offset from an edge.

The stapler 100 may be described with reference to a front 110, a rear 120, a bottom 130, a top 140, a left-hand side 150, and a right-hand side 160 of the stapler 100. As illustrated in FIGS. 1A-1C, the length may be measured as a dimension from the front 110 to the rear 120 of the stapler 100, the width may be measured as a dimension from the left-hand side 150 to the right-hand side 160 of the stapler 100, and the height may be measured as a dimension from the bottom 130 to the top 140 of the stapler 100, or vice versa. The throat 124 of the stapler 100 may correspond to an open space disposed between the anvil 108 and the carrier 128 of the stapler 100.

A carrier 128 may be operatively attached to the handle 112 and include a volume where a group of staples may be held in position before being ejected from a staple ejection area 136 of the stapler 100. The carrier 128 may be made from steel and, in some cases, may be made from sheet metal (e.g., bent or formed sheet metal, etc.).

The stapler 100 may comprise an indicator window 132. The indicator window 132 may be disposed in at least one side of the carrier 128. As shown in FIG. 1A, the indicator window 132 is disposed near, or adjacent to, a portion of the carrier 128 at the front 110 of the stapler 100. It is an aspect of the present disclosure that the indicator window 132 provides an aperture from an outside of the carrier 128 to an inside of the carrier 128 (e.g., where the group of staples are held).

In some embodiments, the stapler 100 may be centerline symmetrical about a plane running through at least a portion of the stapler 100. For instance, plane may run through the stapler 100 intersecting with centerline 106. This plane may be defined in the YZ-plane shown in the coordinate system 102. In this example, the features of the stapler 100 that are centerline symmetrical are mirrored about the YZ-plane. As such, one or more features of the stapler 100 may be described, or illustrated, on one side of the stapler 100 (e.g., the left-hand side or the right-hand side 160) and will equally apply to the other side of the stapler 100 (e.g., the right-hand side 160 or the left-hand side 150).

Referring now to FIG. 1B, a rear perspective view of the stapler 100 is shown in accordance with embodiments of the present disclosure. The stapler 100 may include a magazine release button 138 at least partially disposed in an internal cavity 144 of the stapler 100. As shown in FIG. 1B, the internal cavity 144 may be disposed in at least one of the base 103 and the anvil 108 of the stapler 100. The magazine release button 138 may be pushed to release a magazine for loading the stapler 100 with staples. For instance, the magazine release button 138 may be attached to a release catch 139 via overmolding, insert molding, gluing, pinning, crimping, and/or via some other fastening (e.g., screwing, bolting, welding etc.). as the magazine release button 138 is pushed, the release catch 139 may pivot (e.g., about the pivot axis 114) and release a magazine from a locked position inside the carrier 128 to an open position at least partially exposed from the carrier 128 toward the front 110 of the stapler 100. Details of the magazine release button 138 and staple magazine are described in greater detail in FIGS. 3A-3D.

FIG. 1C shows an exploded front perspective view of the stapler 100 in accordance with embodiments of the present disclosure. As illustrated in FIG. 1C, the stapler 100 may include a hammer 156 that engages with a single staple in a group of staples held in the carrier 128. For instance, as the handle 112 is actuated, and pivots relative to the base 103, the hammer 156 moves into contact with the crown of a staple and ejects the staple from the staple ejection area 136 of the carrier 128.

In some embodiments, the handle 112 may move (e.g., pivotally) relative to the carrier 128 and/or the anvil 108. For instance, the handle 112 may be attached to the carrier 128 via a pivot member 152 and pivot feature 154 interconnection. The pivot member 152 may correspond to a pin or cylindrical protrusion extending from a center of the stapler 100 to the left-hand side 150 and/or the right-hand side 160. This pin may interconnect with the pivot feature 154 in the handle 112. The pivot feature 154 may be a hole disposed in, or through, the handle 112 (e.g., arranged toward the rear 120 of the stapler 100). The hammer 156 may be affixed to the inside of the handle 112 and move only when the handle 112 moves.

In some embodiments a spring element may be disposed between the carrier 128 and the handle 112. For instance, a handle spring 129 may provide a force between the handle 112 and the carrier 128, biasing the handle 112 and hammer 156 in a position above the staples in the carrier 128. The handle spring 129 may correspond to one or more compression springs (e.g., helical wire springs, die springs, spring washers, disc springs, etc.). To engage the stapling mechanism of the stapler 100, the user may apply a force to the handle 112. This force may pivot the handle 112 and the hammer 156 about the pivot axis 114, compress the handle spring 129, and drive the hammer 156 into a portion of the carrier 128. In some embodiments, this force may cause the handle 112, the hammer 156, and the carrier 128 to pivot about the X-axis (e.g., providing a clockwise rotation in the YZ-plane). As shown in FIG. 1C, a carrier spring 127 may be disposed between the carrier 128 and a frame of the stapler 100. The carrier spring 127 may bias the carrier 128 in an unactuated, open, and/or unpivoted state. In some embodiments, the force applied by a user may first compress the carrier spring 127 allowing a portion of the carrier 128 to contact a stack of papers, for example, and then compress the carrier 128 moving the hammer 156 into contact with a staple in the carrier 128. The force applied and the rotation, or pivoting, of the carrier 128 and handle 112 may move the hammer 156 and eject a staple through the staple ejection area 136 (e.g., and then through media to be stapled, papers, etc.) and onto a portion of the slidable strike plate 116. As the staple is ejected, the legs of the staple may contact and be shaped by a forming area of the slidable strike plate 116. Once the stapling has been completed, the user may cease the application of the force on the handle 112. In response, the carrier spring 127 and the handle spring 129 may cause the stapler to return to the unactuated position (e.g., shown in FIG. 1A).

In some embodiments, the stapler 100 may have various shapes, lengths, widths, heights, or other dimensions. For instance, the stapler 100 may possess a rectangular shape, and may be a "standard" stapler (e.g., having length by width by height (L×W×H) dimensions of 180 mm×30.8 mm×53 mm), a "half" stapler (e.g., having L×W×H dimensions of 132.5 mm×30.8 mm×53 mm), or a "mini" stapler (e.g., having L×W×H dimensions of 61.2 mm×30.7 mm×39 mm). These dimensions are approximate and may change depending on a desired application for the stapler, design features, and user preferences. The shapes and dimensions of the stapler 100 described herein are in no way limited to the examples listed.

The slidable strike plate 116 may be moveable from a first staple forming position to a second staple forming position via sliding in a direction along the Z-axis. In some embodiments, the slidable strike plate 116 may be attached to a sliding detent spring 148. The sliding detent spring 148 may include a dimple, or other protrusion that engages with a portion of the anvil 108 and maintains the position of the slidable strike plate 116 when moved into one of the first staple forming position or the second staple forming position. The sliding detent spring 148 may slide along with the slidable strike plate 116 and be held in place via a mount screw (e.g., screw, shoulder screw, etc.) or pin. The mount screw may prevent the sliding detent spring 148 from moving substantially in the Y-axis direction. In some embodiments, the mount screw may be disposed in a slot of the sliding detent spring 148 that allows the sliding detent spring 148 to translate along the Z-axis direction with movement of the slidable strike plate 116.

FIGS. 2A-2H show various views of the slidable strike plate 116 in accordance with embodiments of the present disclosure. It is an aspect of the present disclosure that the slidable strike plate 116 may be moved from a first staple forming position to a different second staple forming position. For instance, the stapler 100 having the slidable strike plate 116 may form staples with an inwardly crimped shape and also form staples with an outwardly crimped shape.

Figure 2A:
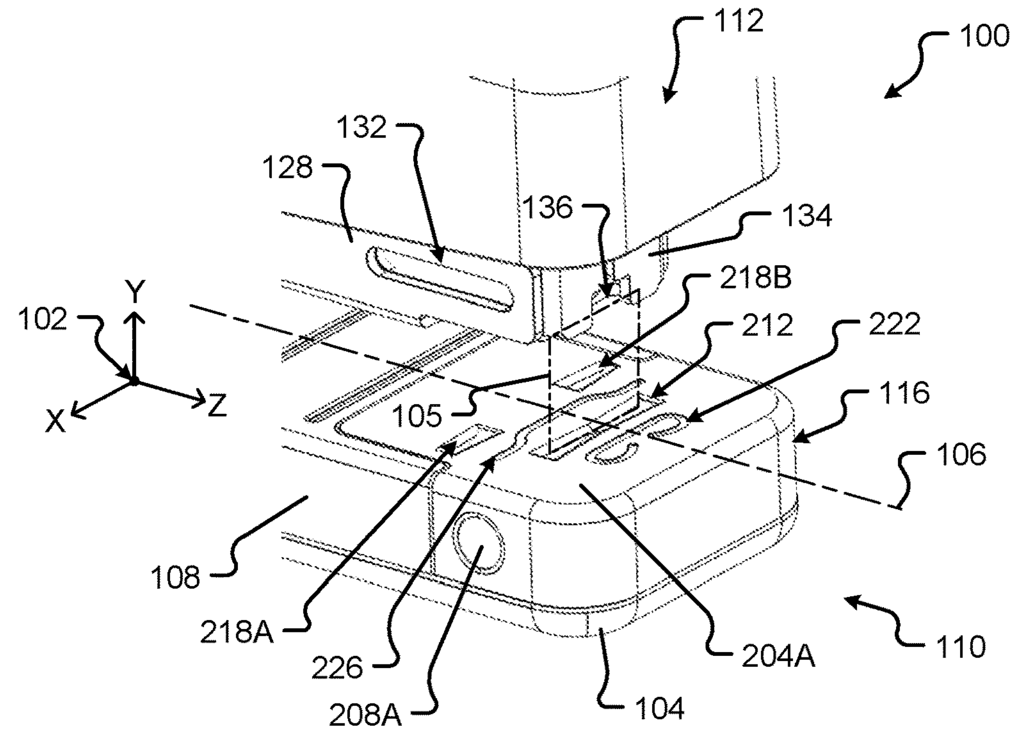
FIG. 2A shows a detail section perspective view of the slidable strike plate of the stapler shown in FIG. 1A in a retracted state.

FIG. 2A shows a detail section perspective view of the slidable strike plate 116 of the stapler 100 in a retracted state or first staple forming position. In this retracted state of the slidable strike plate 116, the stapler 100, when actuated, forms a staple having the inwardly crimped shape. For instance, the staple punch area 134 of the carrier 128 is aligned with the inward staple form 212 disposed in the slidable strike plate 116. As a staple is ejected from the carrier 128, via the staple ejection area 136, the legs of the staple follow along the vertical centerlines of the stapling plane 105 shown along the Y-axis direction toward the inward staple form 212 (e.g., the first staple forming recess) disposed in the slidable strike plate 116. The first staple forming recess is arranged in a first forming plane and disposed in the body of the strike plate 116. The first forming plane is parallel to the stapling plane and when in the retracted state, the first forming plane and the first staple forming recess are arranged in the stapling plane. In some embodiments, the inward staple form 212 may include a number of surfaces that progressively bend and shape the legs of the ejected staple as the handle 112 is pivoted to move toward the slidable strike plate 116.

The shape of the staple produced by a particular form 212, 218A-B is indicated by an indicator 222, 226, or marking, adjacent to the respective form 212, 218A-B. These indicators 222, 226 may be etched, scored, machined, formed, painted, masked, and/or otherwise marked on the upper surface 204A of the slidable strike plate 116. As illustrated in FIG. 2A, the slidable strike plate 116 includes an inward staple indicator 222 adjacent to the inward staple form 212 and an outward staple indicator 226 adjacent to the first leg outward staple form 218A and the second leg outward staple form 218B.

The slidable strike plate 116 may include one or more grip features 208A, 208B. The grip features 208A, 208B may be disposed on opposing sides of the slidable strike plate 116. For instance, and as shown in FIGS. 2C-2D, a first grip feature 208A may be disposed on the left-hand side 250 of the slidable strike plate 116 and a second grip feature 208B may be disposed on the right-hand side 260 of the slidable strike plate 116. In some embodiments, the grip features 208A, 208B may be disposed in, or on, an outer wall 232 of the slidable strike plate 116. The grip features 208A, 208B may be configured as at least one dimple, knurled surface, grooved surface, textured surface, dome, protrusion, combinations thereof, and/or some other interrupted surface. In any event, the grip features 208A, 208B provide an area where a user can grip in moving the slidable strike plate 116 from a retracted position to an extended position.

Figure 2B:
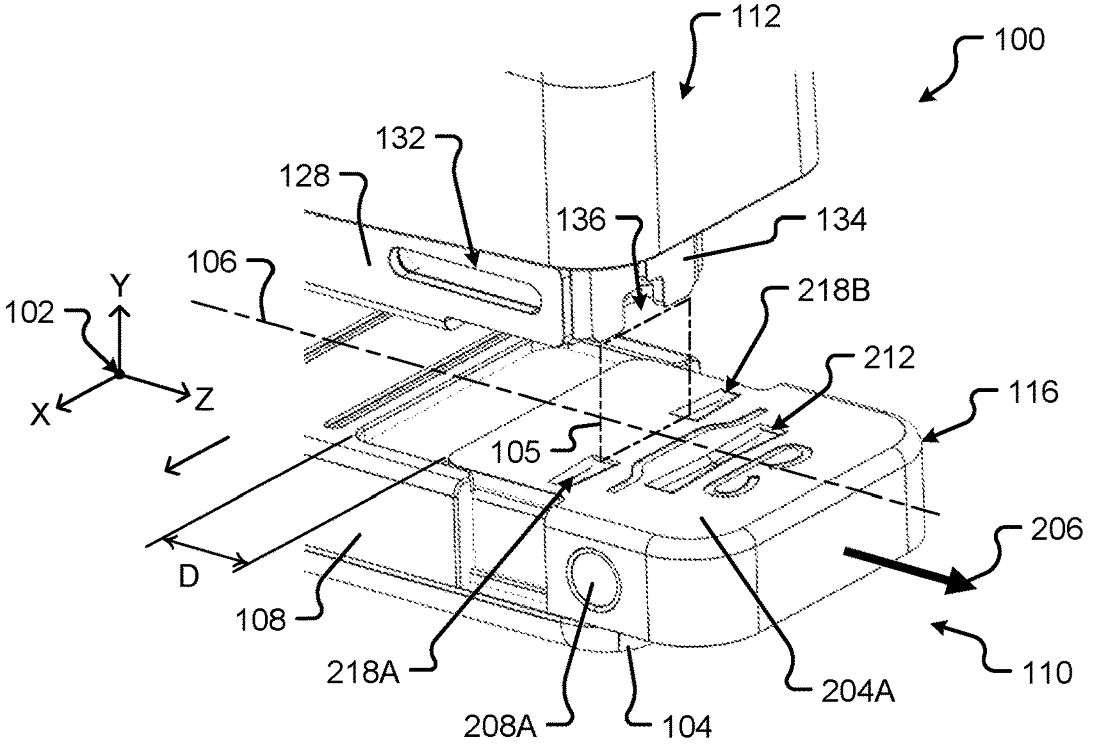
FIG. 2B shows a detail section perspective view of the slidable strike plate of the stapler shown in FIG. 1A in an extended state.
Figure 2C:
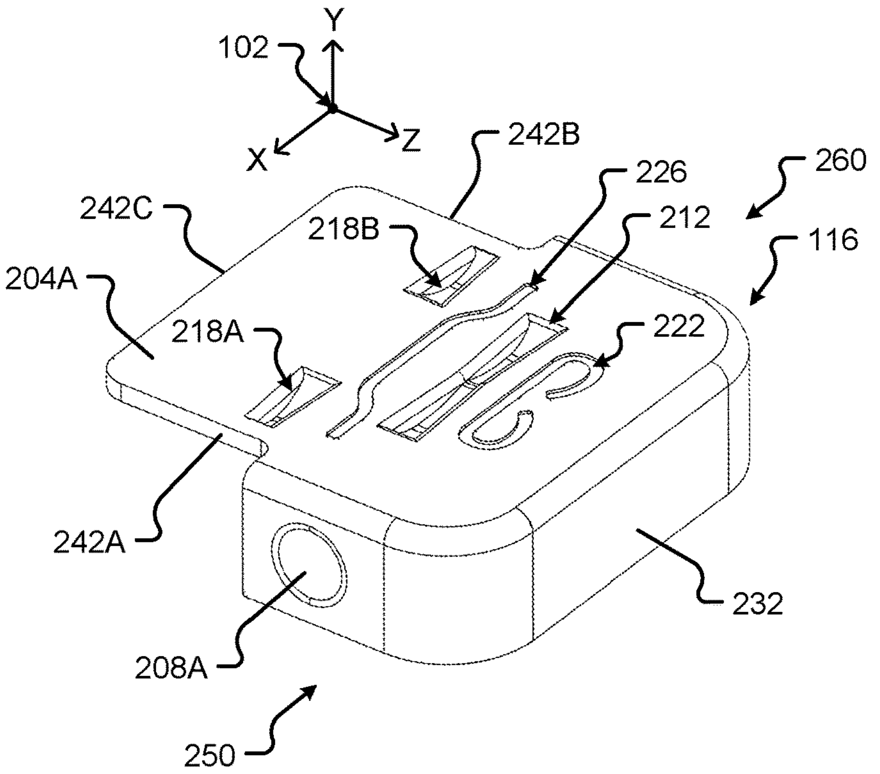
FIG. 2C shows a front perspective view of the slidable strike plate in accordance with embodiments of the present disclosure.
Figure 2D:
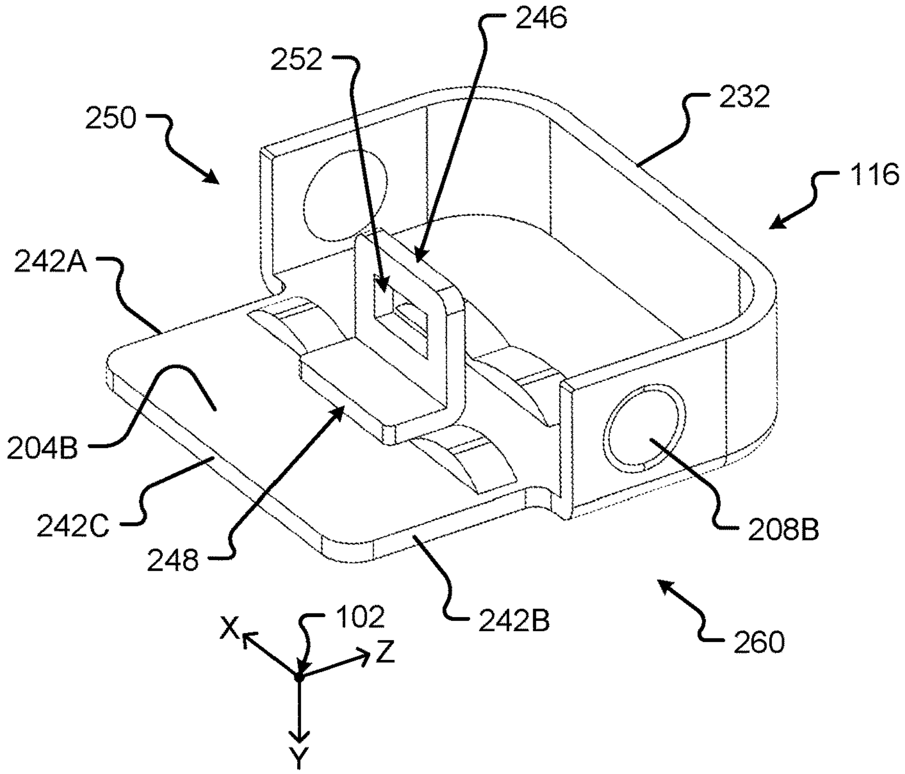
FIG. 2D shows a bottom rear perspective view of the slidable strike plate in accordance with embodiments of the present disclosure.

As shown in FIG. 2B, the slidable strike plate 116 may be moved from the first staple forming position (e.g., shown in FIG. 2A) to the second staple forming position when the slidable strike plate 116 is moved in the pull force direction 206. In FIG. 2B, the slidable strike plate 116 is displaced a distance, D, along the Z-axis direction such that the second staple forming recess 218 (e.g., first and second leg outward staple forms 218A, 218B) are arranged in the stapling plane 105. In the second staple forming position, the staple punch area 134 aligns with the first leg outward staple form 218A and the second leg outward staple form 218B disposed in the slidable strike plate 116. In this extended position, the stapler 100, when actuated, forms a staple having the outwardly crimped shape. As a staple is ejected from the carrier 128, via the staple ejection area 136, the legs of the staple follow along the vertical centerlines of the stapling plane 105 shown along the Y-axis direction toward the first and second leg outward staple forms 218A, 218B in the slidable strike plate 116. The first and second leg outward staple forms 218A, 218B may include a number of surfaces that progressively bend and shape the legs of the ejected staple as the handle 112 is pivoted to move toward the slidable strike plate 116.

In FIGS. 2A and 2B, the position of the staple punch area 134 remains constant relative to portions of the stapler 100 other than the slidable strike plate 116. Stated another way, the position of the staple punch area 134 is the same distance from the pivot axis 114 in both states of the slidable strike plate 116 (e.g., extended or retracted). However, moving the slidable strike plate 116 relative to the staple punch area 134 positions a particular form (e.g., first leg outward staple form 218A/second leg outward staple form 218B, inward staple form 212) into place beneath and/or in-line with the staple punch area 134.

FIGS. 2C and 2D show various perspective views of the slidable strike plate 116 in accordance with embodiments of the present disclosure. The slidable strike plate 116 may comprise a body having a substantially planar upper surface 204A, an inner surface 204B offset from the upper surface 204A a distance in the Y-axis direction, and one or more outer walls 232 extending from the inner surface 204B in a direction away from the upper surface 204A and the inner surface 204B. In some embodiments, one or more grip features 208A, 208B may be disposed in the outer walls 232 of the slidable strike plate 116. For instance, the slidable strike plate 116 may include a first grip feature 208A disposed in a portion of the outer wall 232 on the left-hand side 250 of the slidable strike plate 116. Additionally or alternatively, the slidable strike plate 116 may include a second grip feature 208B disposed in a portion of the outer wall 232 on the right-hand side 260 of the slidable strike plate 116 (e.g., as shown in FIG. 2D).

The slidable strike plate 116 may include a first guide edge 242A, a second guide edge 242B, and a rear edge 242C spanning between the first guide edge 242A and the second guide edge 242B. The first and second guide edges 242A, 242B may contact, and even slid along, corresponding features disposed in the anvil 108 of the stapler 100. In some embodiments, these corresponding features may be referred to as rails or sliding guides. Among other things, the interaction between the guide edges 242A, 242B and rails of the anvil 108 may control movement of the slidable strike plate 116 in a linear motion along the Z-axis direction. Additionally or alternatively, the interaction may prevent rotation of the slidable strike plate 116 about the Y-axis. In one embodiment, the rear edge 242C may be configured to contact a corresponding edge disposed in the anvil 108 (e.g., when the slidable strike plate 116 is in a retracted state). The corresponding edge may serve as an end of travel stop for the slidable strike plate 116 when moved from the extended position to the retracted position.

The slidable strike plate 116 may include a sliding travel stop 246 disposed on the inner surface 204B. The sliding travel stop 246 may fit inside the sliding travel limit aperture 111 of the anvil 108 shown in FIG. 1C. As the slidable strike plate 116 moves from a retracted position to an extended position, a portion of the sliding travel stop 246 may contact a front-most surface of the sliding travel limit aperture 111. This contact between the sliding travel stop 246 and the surface of the sliding travel limit aperture 111 may prevent the slidable strike plate 116 from being removed from the anvil 108 and/or stapler 100 completely. Additionally or alternatively, the contact between the sliding travel stop 246 and the surface of the sliding travel limit aperture 111 may position the first leg outward staple form 218A and the second leg outward staple form 218B underneath and in-line with the staple punch area 134 of the carrier 128.

The sliding travel stop 246 may be formed from the sliding travel stop 246 or attached to the inner surface 204B via a mount flange 248. In some embodiments, the mount flange 248 may be bonded, welded, adhered, fastened, or otherwise affixed to the slidable strike plate 116. As illustrated in FIG. 2D, the sliding travel stop 246 may extend from the inner surface 204B in a direction along the Y-axis. In one embodiment, a detent spring receiving aperture 252 (e.g., hole, slot, or other cutout, etc.) disposed in a portion of the sliding travel stop 246. The detent spring receiving aperture 252 may be configured to receive a tab of a sliding detent spring 148.

Referring now to FIGS. 2E-2H, various views of the slidable strike plate 116 in a retracted position (e.g., FIGS. 2E-2F) corresponding to the first staple forming position and in an extended position (e.g., FIGS. 2G-2H) corresponding to the second staple forming position are shown in accordance with embodiments of the present disclosure. For the sake of clarity the base 103 of the stapler 100 is not shown in FIGS. 2E-2H. When the slidable strike plate 116 is in the first staple forming position, the stapler 100 may make an inwardly crimped staple 202A when actuated. When the slidable strike plate 116 is in the second staple forming position the stapler 100 may make an outwardly crimped staple 202B when actuated. It should be appreciated that embodiments of the stapler 100 are not limited to the staple forms described herein and other staple forms may be made depending on the forming features disposed in the slidable strike plate 116. Additionally or alternatively, the positions of the forming features in the slidable strike plate 116 may be reversed, or swapped, such that the retracted position produces the outwardly crimped staple 202B and the extended position produces the inwardly crimped staple 202A.

Figures 2E, 2F, 2G, 2H:
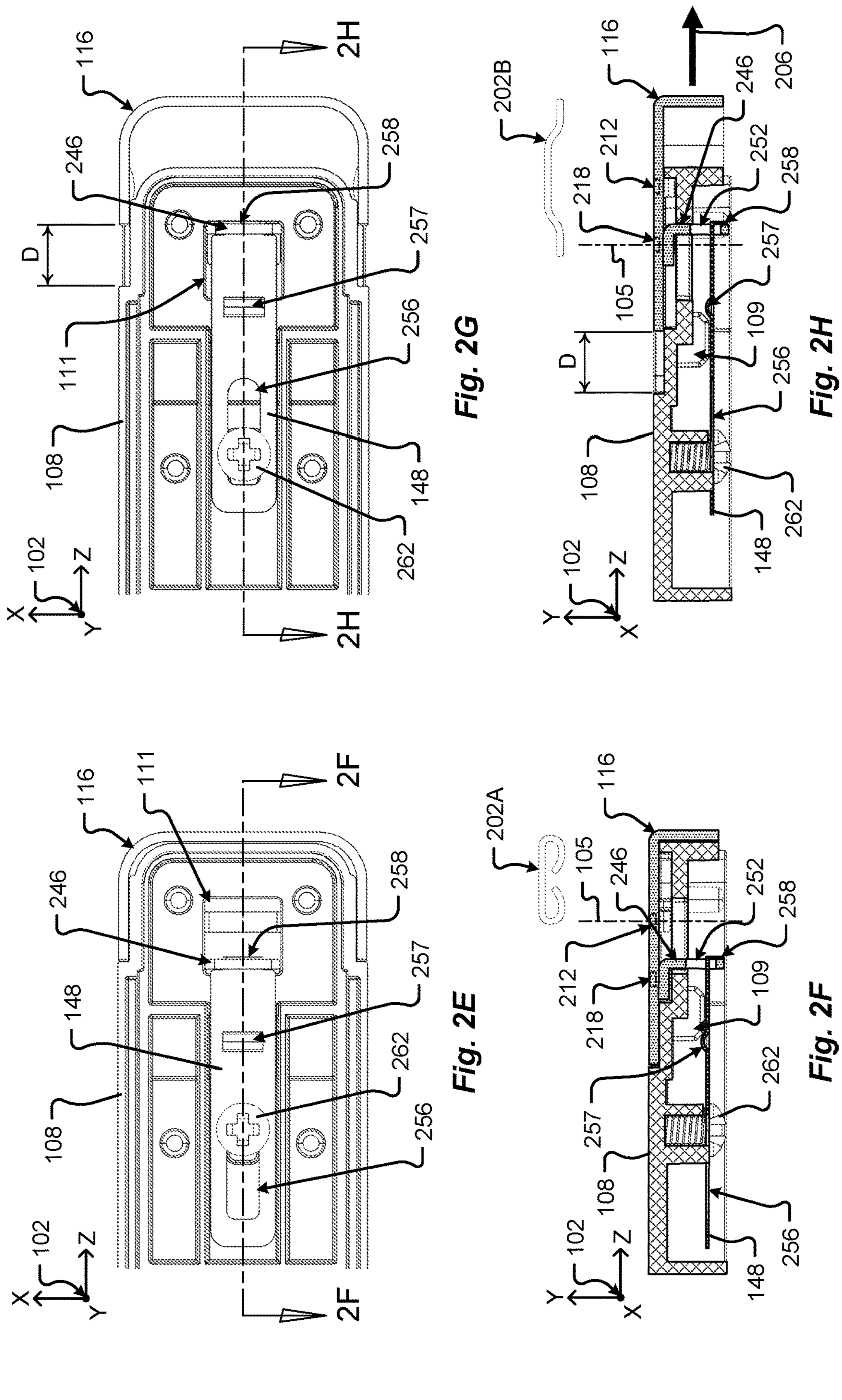
FIG. 2E shows a bottom section plan view of the stapler and slidable strike plate shown in FIG. 2A.
FIG. 2F shows a section elevation view of the stapler and slidable strike plate taken through the stapler at line 2F-2F of the bottom section plan view shown in FIG. 2E.
FIG. 2G shows a bottom section plan view of the stapler and slidable strike plate shown in FIG. 2B.
FIG. 2H shows a section elevation view of the stapler and slidable strike plate taken through the stapler at line 2H-2H of the bottom section plan view shown in FIG. 2G.

As shown in FIGS. 2E-2H, the sliding detent spring 148 is slidably mounted to the underside of the anvil 108 via a mount screw 262. The mount screw 262 is disposed in a slot 256 in the sliding detent spring 148. The mount screw 262 retains the sliding detent spring 148 in a position close to the anvil 108 but allows the sliding detent spring 148 to slide in the Z-axis direction) along with movement of the slidable strike plate 116. In some embodiments, the mount screw 262 may be screwed to a protrusion under the anvil 108 preventing the mount screw 262 from clamping the sliding detent spring 148 to the anvil 108. The sliding detent spring 148 may include a slot 256, a detent dimple 257, and a bent end tab 258. In one embodiment, the bent end tab 258 may insert into the detent spring receiving aperture 252 of the sliding travel stop 246 of the slidable strike plate 116. Once inserted, the bent portion of the bent end tab 258 may hook onto a portion of the sliding travel stop 246. As shown in FIG. 2F, the detent dimple 257, in the retracted position of the slidable strike plate 116, is shown on a rear side of the detent protrusion 109. In this first staple forming position, the inward staple form 212, or first staple forming recess, is disposed in the stapling plane 105. As the slidable strike plate 116 is moved between the retracted position and the extended position (e.g. shown in FIGS. 2G-2H) the detent dimple 257 may contact the detent protrusion 109 in the anvil 108 and bend the sliding detent spring 148 about the X-axis. Once moved fully forward (e.g., in the extended position), the detent dimple 257 may be disposed on a front side of the detent protrusion 109. This detent interaction with the detent protrusion 109 of the anvil 108 may allow a user to feel resistance while moving the slidable strike plate 116 between positions and detect a positive location, or click, when engaged in the extended and/or retracted positions.

As shown in FIGS. 2G and 2H, the slidable strike plate 116 is displaced in the extended state associated with the second staple forming position. The slidable strike plate 116 has been displaced a distance, D, which is shown measured from different points along the slidable strike plate 116 and anvil 108 in FIGS. 2G and 2H. In this second staple forming position, the second staple forming recess 218 (e.g., first leg outward staple form 218A and the second leg outward staple form 218B) is disposed in the stapling plane 105 and the front-most portion of the slidable strike plate 116 extends past the front 110 of the stapler 100. In one embodiment, the displacement distance, D, may be limited, or set, via a dimension of the sliding travel limit aperture 111 in which the sliding travel stop 246 moves. For instance, a length of the sliding travel limit aperture 111 along the Z-axis direction may define the displacement distance, D. In some embodiments, the displacement distance, D, may be set by a length of the slot 256 in the sliding detent spring 148 (e.g., along the Z-axis direction). In any case, the slidable strike plate 116 may be prevented from being removed from the anvil 108 via the sliding detent spring 148 interacting with the sliding travel stop 246, the sliding travel limit aperture 111 interacting with the sliding travel stop 246, and/or any other keyed feature of the slidable strike plate 116 and the stapler 100.

It is an aspect of the present disclosure that a user may switch between the first staple forming position of the slidable strike plate 116 and the second staple forming position of the slidable strike plate 116 using a single hand. As such, the stapler 100 allows users with hand injuries and/or limited capabilities to quickly change a function of the stapler 100 without requiring assistance.

FIGS. 3A-3D show various views of a carrier subassembly 300 of the stapler 100 comprising a carrier 128 and magazine 304 in accordance with embodiments of the present disclosure. The carrier subassembly 300 may include a frame 301 to which a carrier 128 is attached. In one embodiment, the frame 301 may correspond to a U-shaped sheet metal part. In some embodiments, the carrier 128 may house a magazine 304 configured to hold one or more staples. For instance, the magazine 304 may be designed to hold a full strip of staples. In one embodiment, a full strip of staples may comprise approximately hundreds staples joined together. However, it should be appreciated that the full strip of staples may comprise more or fewer than one hundred staples. In some embodiments, the magazine 304 may hold multiple staple strips (e.g., disposed end to end along the Z-axis direction). The type and size of the staples are not limited by the embodiments of the present disclosure and, as such, any type and/or size of staple may be utilized in accordance with embodiments of the present disclosure. For example, the stapler 100 may utilize staples comprised of a fine wire, a medium wire, or a heavy wire.

The magazine 304 may slidably engage with the carrier 128. The magazine 304 may be selectively locked and released from a position inside the carrier 128 via a magazine latch area 312. For instance, as the magazine release button 138 is pressed (e.g., in the pressing force direction 306) the release catch 139 may pivot and release the magazine 304 along the Z-axis direction (e.g., the magazine translation direction 311). Once released, the magazine 304 may extend from the carrier 128 and beyond a front of the stapler 100 defined by the front of stapler plane 314 (e.g., shown in FIG. 3B). In some embodiments, this plane 314 may correspond to the front-most portion of the stapler 100. The magazine 304 may be loaded with a group of staples 302 in this extended position. In particular, the group of staples 302 may be inserted into the staple receiving cavity 322 of the magazine 304, which is disposed outside of the front of stapler plane 314. After the group of staples 302 are inserted into the staple receiving cavity 322, the magazine 304 may be pushed toward the rear 120 of the stapler 100, where the magazine 304 may again engage with the magazine latch area 312 and lock into place. As a user pushes the magazine 304 toward the rear 120 of the stapler 100, the group of staples 302 may contact the staple contact face 324 of the pusher 316 and the inner surface of the end plate 308 of the magazine 304. This contact may displace the pusher 316 along the Z-axis direction toward the rear 120 of the stapler 100. In some embodiments, the pusher 316 may translate along a guide rod 320 attached to the frame 301 and/or the carrier 128. A spring disposed between the pusher 316 and the rear-most portion of the carrier subassembly 300 may bias the pusher 316 toward the front 110 of the stapler 100. Additionally or alternatively, the spring may force the pusher 316 into contact with the group of staples 302 inside the magazine 304 continuously biasing the group of staples 302 against the inner surface of the end plate 308.

The carrier 128 may include an indicator window 132. As provided above, the indicator window 132 may indicate whether the stapler 100 includes staples, is empty of staples, or is running low on staples. The magazine 304 includes a magazine staple window 332 that, when in the locked position, aligns with the indicator window 132 in the carrier 128. When aligned, the indicator window 132 and the magazine staple window 332 provide an ability to view objects or components in the staple receiving cavity 322 of the magazine 304. For example, a user may be able to observe staples and/or a portion of the pusher 316 from the indicator window 132 without opening the magazine 304.

Figures 3A, 3B:
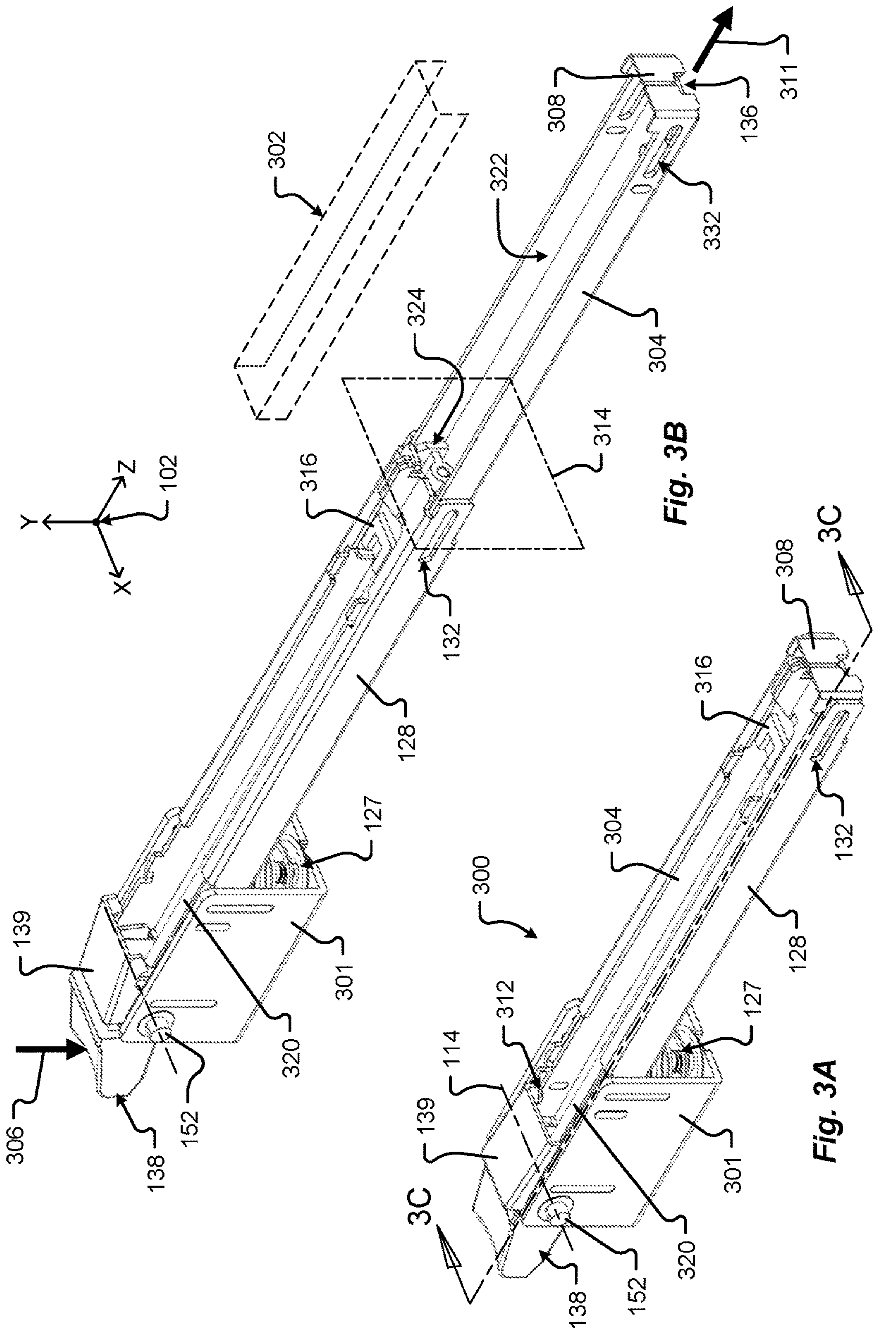
FIG. 3A shows a front perspective view of the carrier and magazine of the stapler in a closed position in accordance with embodiments of the present disclosure.
FIG. 3B shows a front perspective view of the carrier and magazine of the stapler in an open position in accordance with embodiments of the present disclosure.
Figure 3C:
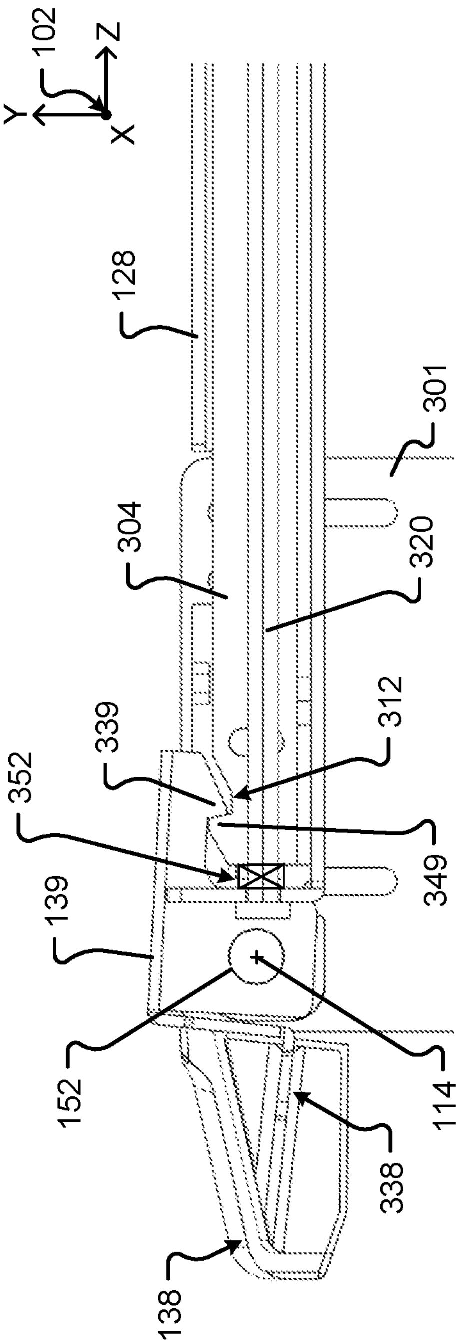
FIG. 3C shows a section elevation view of the release mechanism for the magazine of the stapler in a latched state in accordance with embodiments of the present disclosure.
Figure 3D:
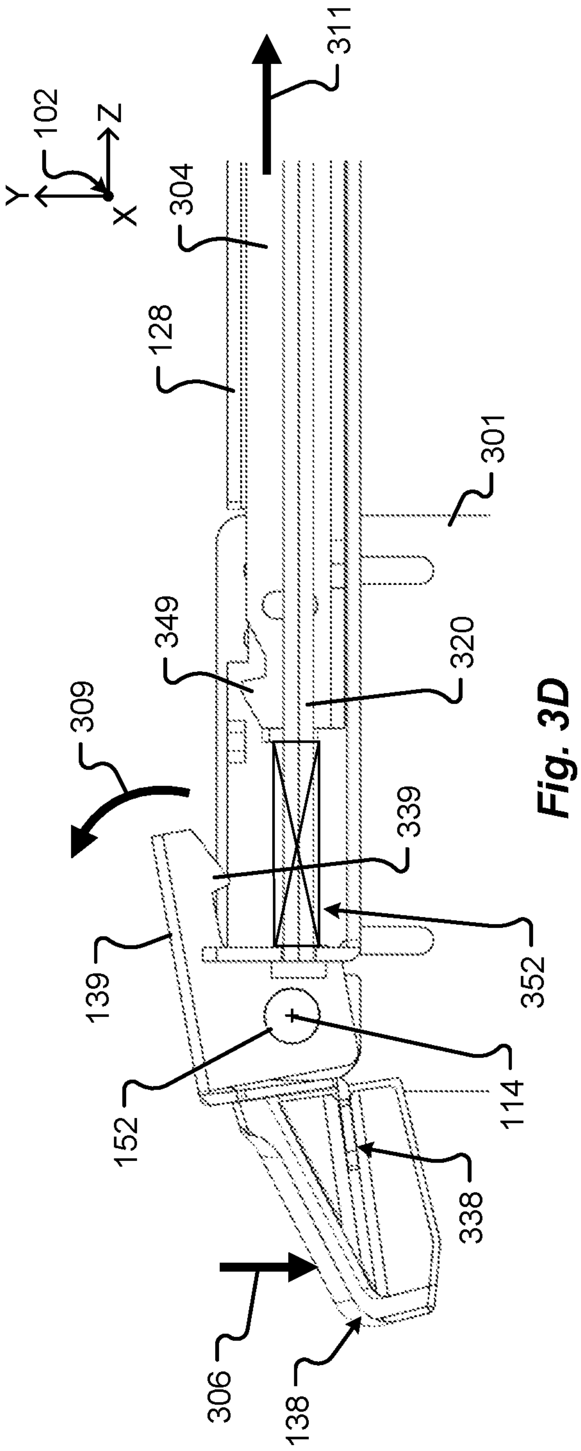
FIG. 3D shows a section elevation view of the release mechanism for the magazine of the stapler in an unlatched state in accordance with embodiments of the present disclosure.

FIG. 3C shows a partial section elevation view of the release mechanism for the magazine of the stapler in a latched state in accordance with embodiments of the present disclosure. The section is taken through line 3C-3C of the carrier subassembly 300 shown in FIG. 3A. In some embodiments, the release mechanism may correspond to the magazine release button 138, the release catch 139, and magazine hook 349 of the magazine 304. The magazine release button 138 may be attached to the release catch 139 at a button and catch connection 338. As provided above, this connection may be glued, molded, pinned, crimped, and/or otherwise fastened. The release catch 139 may be pivotally attached to the frame 301 via a pivot member 152. The release catch 139 may include a catch hook 339 that contacts a magazine hook 349 disposed in a portion of the magazine 304. In some embodiments, a spring element 352 may be disposed between the rear of the carrier 128 and the magazine 304. The spring element 352 may provide a spring force against the magazine 304 such that, when released from the locked position, the magazine 304 moves in the magazine translation direction 311 via aid from the spring element 352. The spring element 352 may be a helical wire compression spring or the like. As shown in FIGS. 3C and 3D, the guide rod 320 may be connected to the carrier 128 and, in some cases, may include a flanged head to prevent the guide rod 320 from moving relative to the carrier 128.

In FIG. 3D, a user may push the magazine release button 138 in a pressing force direction 306. The pressing force direction 306 may correspond to a direction along the negative Y-axis (e.g., down). As the user pushes the magazine release button 138, the connected release catch 139 may pivot at the pivot axis 114 (e.g., around the pivot member 152) moving the catch hook 339 in a rotational direction 309 away from the magazine 304. When the catch hook 339 separates from the magazine hook 349 in the magazine 304, the magazine 304 may extend forwards in the magazine translation direction 311 (e.g., toward the front 110 of the stapler 100). The user may push the magazine release button 138, load the magazine 304 with a group of staples 302, and close the magazine 304 inside the carrier 128 with a single hand. As such, the stapler 100 allows users with hand injuries and/or limited capabilities to operate every function of the stapler 100.

Figure 3E:
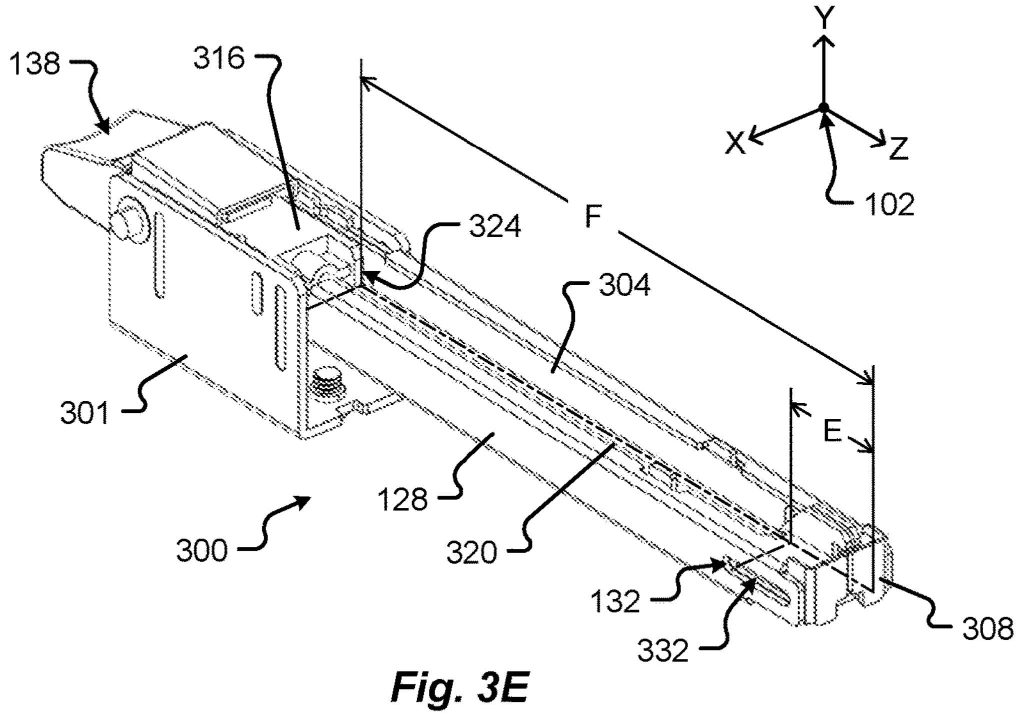
FIG. 3E shows a front perspective view of the carrier and magazine of the stapler in a closed position indicating an emptying pusher positions in the indicator window in accordance with embodiments of the present disclosure.

FIGS. 3E-3I show various views of the indicator window 132 in the carrier 128 of the stapler 100 in accordance with embodiments of the present disclosure. The indicator window may be cutout, slot, or other hole that passes from an outside of the carrier 128 to an inside of the carrier 128 and/or the staple receiving cavity 322 of the magazine 304. In FIG. 3E, a perspective view of the carrier subassembly 300 shows the full, F, and emptying, E, positions of the staple contact face 324 of the pusher 316 measured from the end plate 308 of the magazine 304. When in the full, F, position, the pusher 316 may be disposed at a rear-most position in the magazine 304 with a group of staples 302 disposed between the staple contact face 324 and the end plate 308. When in the emptying position, E, the staple contact face 324 may first be visible in the indicator window 132. Stated another way, as the pusher 316 moves forward (e.g., toward the end plate 308 while ejecting staples, etc.), and prior to reaching the emptying position, E, staples may be visible through the indicator window 132. When a limited number of staples remain in the magazine 304, the staple contact face 324 of the pusher 316 may moves into the area of the indicator window 132 (e.g., in the emptying position, E). This position of the pusher may indicate that the group of staples 302 is running low and the stapler 100 needs to be reloaded. Examples of this progression, as staples are continuously ejected from the stapler 100, are shown in conjunction with FIGS. 3F-3I.

Figure 3F:
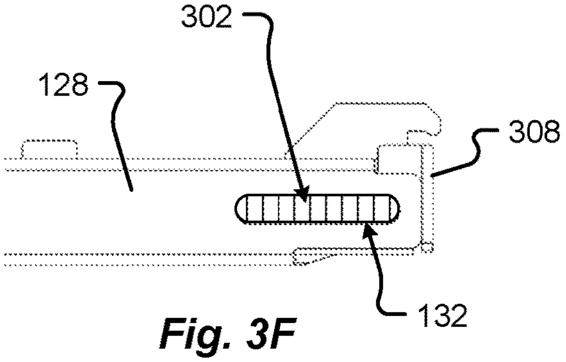
FIG. 3F shows a section elevation view of the carrier and indicator window including a number of visible staples remaining in accordance with embodiments of the present disclosure.

As provided above, FIG. 3F shows an example where the group of staples 302 are visible from the indicator window 132 in the carrier 128 when the pusher 316 is disposed at any point in between the full position, F, and the emptying position, E. For instance, as a user ejects staples from the staple ejection area 136 of the stapler 100 the pusher 316 moves the remaining staples in the group of staples 302 toward the end plate 308.

Figure 3G:
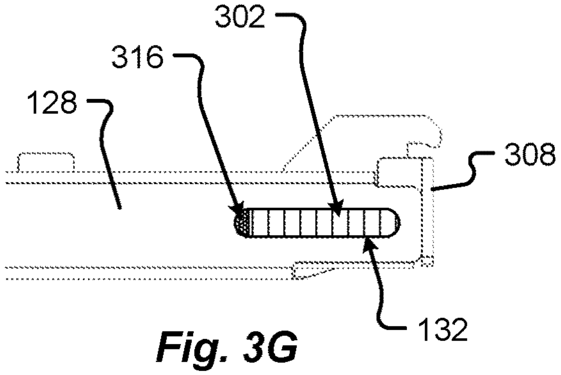
FIG. 3G shows a section elevation view of the carrier and indicator window including a first visible position of the pusher in accordance with embodiments of the present disclosure.

When a specific number of staples in the group of staples 302 remain in the magazine 304, the pusher 316 may move into view from the indicator window 132 as shown in FIG. 3G. As provided above, the pusher 316 may be made from a colored (e.g., red, etc.) material and provide a contrast between the legs of the staples visible in the indicator window 132 and the pusher 316 visible in the indicator window 132. This position of the pusher 316 may indicate that the stapler 100 is emptying and will soon need to be reloaded.

Figure 3H:
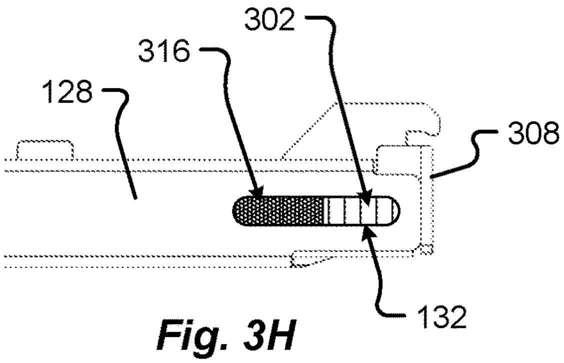
FIG. 3H shows a section elevation view of the carrier and indicator window including a second visible position of the pusher in accordance with embodiments of the present disclosure.

Continuing operation (e.g., stapling or ejecting staples from the staple ejection area 136 of the carrier 128) after the pusher 316 is first visible in the indicator window 132 causes the pusher 316 to continue to move forward toward the end plate 308 of the magazine 304. As can be appreciated, this movement causes a greater amount of the pusher 316 to be visible from the indicator window 132 as shown in FIG. 3H. In this position, the user may only have several staples remaining before the stapler 100 will need to be reloaded.

Figure 3I:
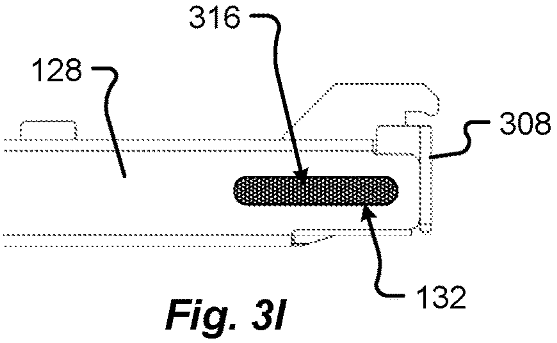
FIG. 3I shows a section elevation view of the carrier and indicator window including a third visible position of the pusher, in an empty state, in accordance with embodiments of the present disclosure.

Once the stapler 100 is emptied of all staples, the pusher 316 may move to a forward-most position to substantially fill the indicator window 132 as shown in FIG. 3I. In some embodiments, the color of the pusher 316 (e.g., red, etc.) may fill an entirety of the indicator window 132. This position of the pusher 316 may be used to quickly identify the stapler 100 as empty and indicate to a user that the stapler 100 needs to be reloaded.

Figure 4B:
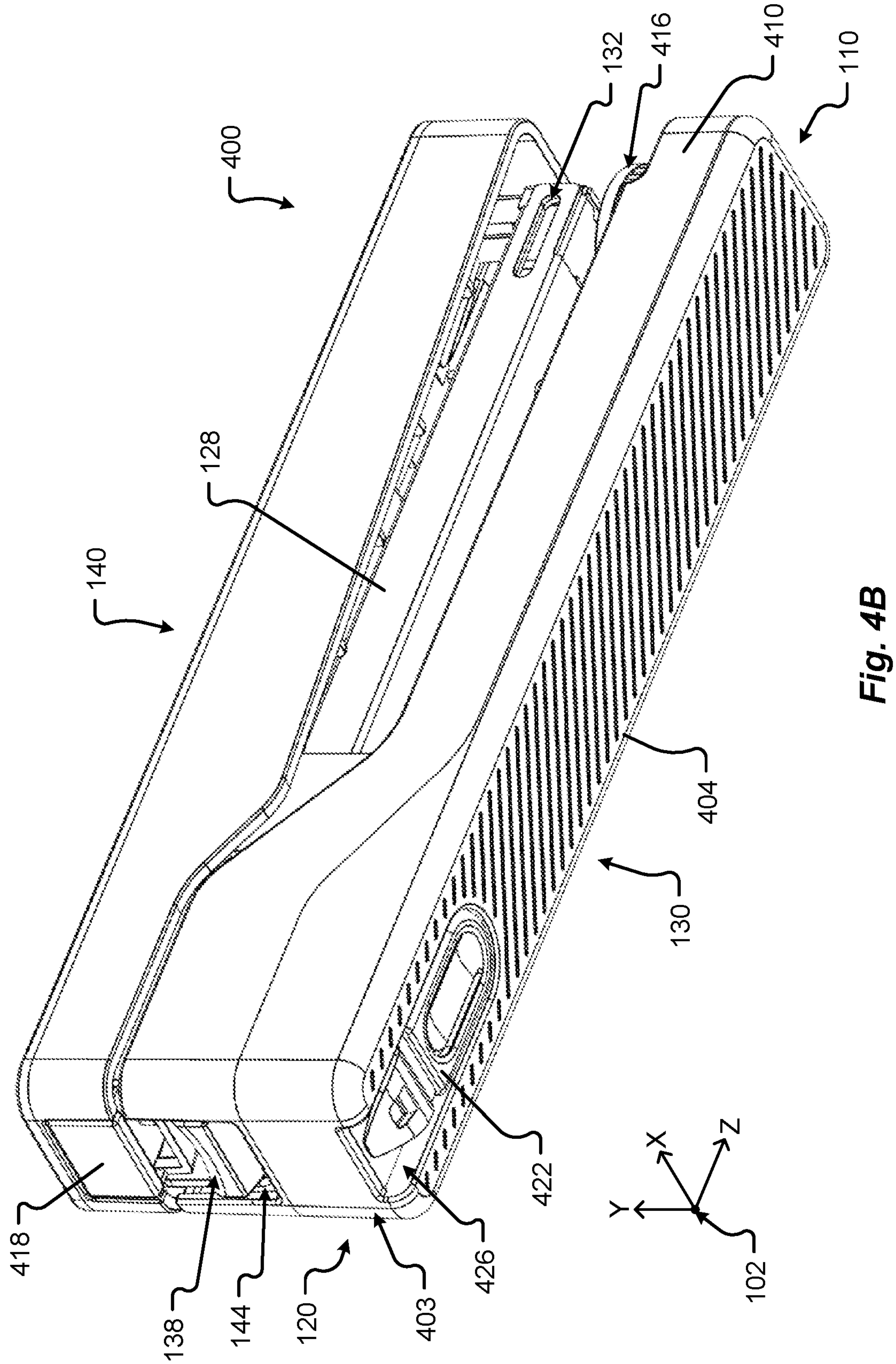
FIG. 4B shows a bottom rear perspective view of the stapler shown in FIG. 4A.
Figure 4C:
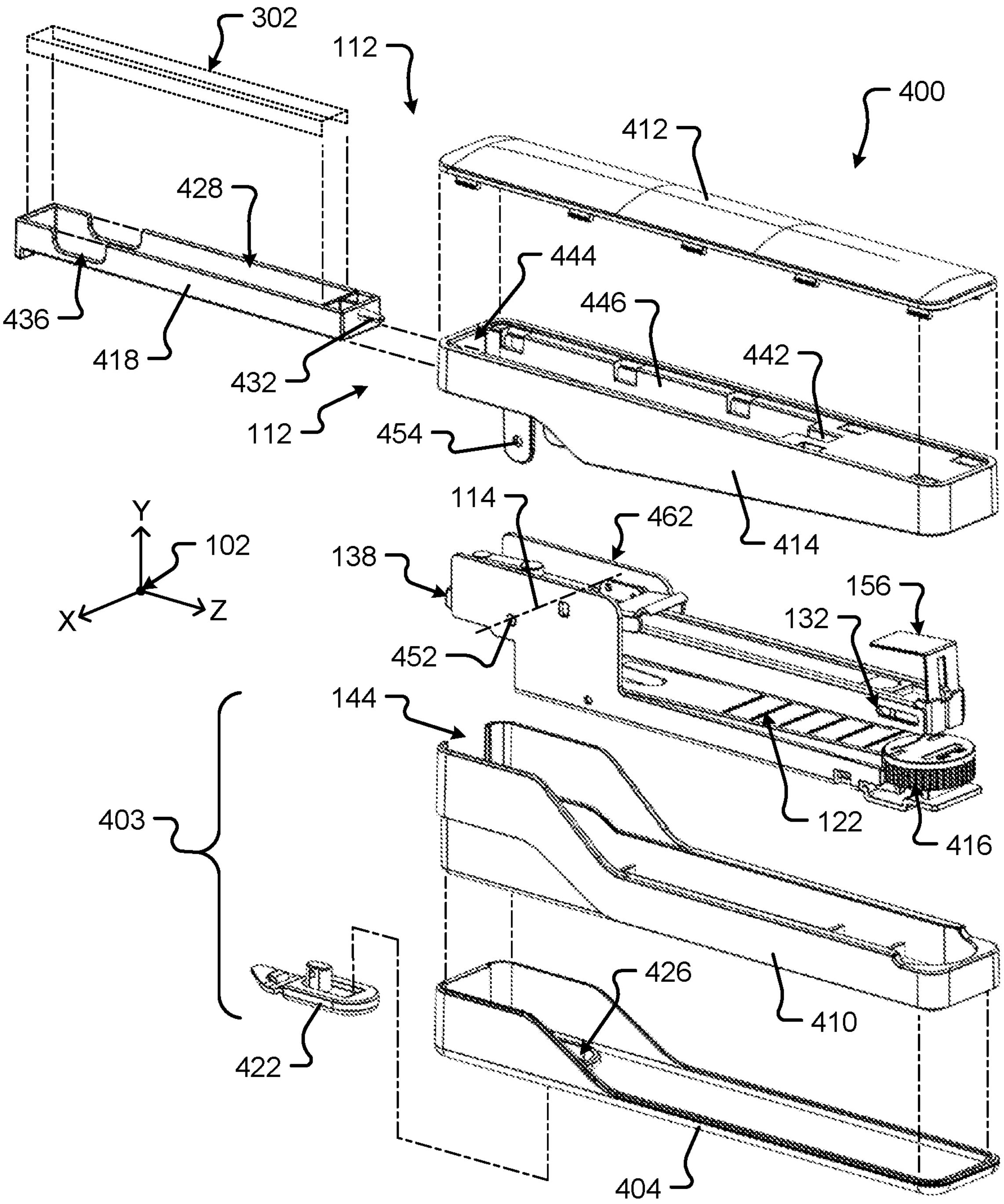
FIG. 4C shows an exploded front perspective view of the stapler shown in FIG. 4A.

Referring now to FIGS. 4A-4C, various views of a stapler 400 are shown in accordance with embodiments of the present disclosure. The stapler 400 may share one or more components with the stapler 100 described in conjunction with FIGS. 1A-1C and 3A-3I above. As such, additional description of these components is omitted for the sake of brevity.

The stapler 400 may comprise a rotatable strike plate 416 that can be moved (e.g., rotated) from a first staple forming position to a second staple forming position. In some embodiments, the first staple forming position may be disposed 180 degrees from the second staple forming position on the rotatable strike plate 416. The stapler 400 may comprise a base 403 (e.g., including a foot 404 and a pivoting anvil 408), a body 410, a handle 112 (e.g., including a handle upper 412 and a handle body 414), and a carrier 128 disposed between the handle body 414 and the base 403. In some embodiments, the handle upper 412 and the handle body 414 together may form the handle 112 of the stapler 400. Additionally or alternatively, the handle 112 may comprise the handle upper 412, the handle body 414, and the carrier 128. In any case, the handle 112 may pivot relative to the base 403 (e.g., about a pivot axis 114). In some embodiments, as the handle 112 pivots, a portion of the carrier 128 may be moved closer toward the pivoting anvil 408 and the rotatable strike plate 416.

The base 403 of the stapler 400 may correspond to one or more cast, formed, molded, and/or machined parts. In some embodiments, the base 403 may comprise one or more components made from plastic, rubber, metal, and/or combinations thereof. In one embodiment, the base 403 may be made from an injection molded plastic component and/or may be coated with a high-friction surface treatment. For instance, the base 403 may be coated with a rubber grip surface. Additionally or alternatively, the base 403 may include a foot 404 disposed on a bottom-most portion of the stapler 400. The foot 404 may be made from rubber and/or include a rubberized (e.g., coated, deposited, and/or formed) surface. In any event, a rubber, or rubber-like, material can offer stability during use and prevent movement of the stapler 400 as the handle 112 is actuated relative to the base 403.

The pivoting anvil 408 may correspond a cast, formed, molded, and/or machined part. In some embodiments, the pivoting anvil 408 may be made from plastic, rubber, metal, and/or combinations thereof. In one embodiment, the pivoting anvil 408 may be made from a metal such as iron, steel, aluminum, etc., and/or combinations or alloys thereof. The pivoting anvil 408 may include a number of features that support, contain, and/or limit movement of the rotatable strike plate 416. The pivoting anvil 408 may include a number of page edge guides 122. The page edge guides 122 may be similar, if not identical, to the page edge guides 122 described in conjunction with the anvil 108 of the stapler 100. The pivoting anvil 408 may pivot relative to the base 403 and/or the body 410 of the stapler 400. For instance, as the stapler 400 ejects a staple from the staple ejection area 136 of the carrier 128, the force of the staple, and/or the carrier 128, may move the rotatable strike plate 416 and pivot the pivoting anvil 408 toward the bottom 130 of the stapler 400.

The body 410 may be a cast, formed, molded, and/or machined part and, in some embodiments, may house a portion of the pivoting anvil 408 and/or the rotatable strike plate 416. The body 410 may include an internal cavity 144 that receives an anvil frame 462 of the stapler 400. The anvil frame 462 may include the carrier 128, pivoting anvil 408, and rotatable strike plate 416 of the stapler 400.

The stapler 400 may be described with reference to a front 110, a rear 120, a bottom 130, a top 140, a left-hand side 150, and a right-hand side 160 of the stapler 400. As illustrated in FIGS. 4A-4C, the length may be measured as a dimension from the front 110 to the rear 120 of the stapler 400, the width may be measured as a dimension from the left-hand side 150 to the right-hand side 160 of the stapler 400, and the height may be measured as a dimension from the bottom 130 to the top 140 of the stapler 400, or vice versa. The throat 124 of the stapler 400 may correspond to an open space disposed between the pivoting anvil 408 and the carrier 128 of the stapler 400.

The carrier 128 may correspond to the carrier 128 described in conjunction with FIGS. 1A-1C and 3A-3I above. For instance, the carrier 128 may include the magazine 304 and an indicator window 132. The indicator window 132 may provide an aperture to view a number of staples remaining in the magazine 304 and to observe whether the pusher 316 is visible.

The stapler 400 may be centerline symmetrical about a plane running through at least a portion of the stapler 400. For instance, plane may run through the stapler 400 intersecting with centerline 106. This plane may be defined in the YZ-plane shown in the coordinate system 102. In this example, the features of the stapler 400 that are centerline symmetrical are mirrored about the YZ-plane. As such, one or more features of the stapler 400 may be described, or illustrated, on one side of the stapler 400 (e.g., the left-hand side or the right-hand side 160) and will equally apply to the other side of the stapler 400 (e.g., the right-hand side 160 or the left-hand side 150).

Referring now to FIG. 4B, a rear bottom perspective view of the stapler 400 is shown in accordance with embodiments of the present disclosure. The stapler 400 may include a staple storage tray 418 disposed in a portion of the handle 112. In some embodiments, the stapler 400 may include a staple remover 422 disposed in a recess 426 arranged in the base 403 and/or the body 410 of the stapler 400. The staple remover 422 may be held in place via one or more ball detents, magnets, tabs, and/or the like.

FIG. 4C shows an exploded front perspective view of the stapler 400 in accordance with embodiments of the present disclosure. As illustrated in FIG. 4C, the stapler 400 may include a hammer 156 that engages with a single staple in a group of staples held in the carrier 128. For instance, as the handle 112 is actuated, and pivots relative to the base 403, the hammer 156 moves into contact with the crown of a staple and ejects the staple from the staple ejection area 136 of the carrier 128.

In some embodiments, the handle 112 may move (e.g., pivotally) relative to the carrier 128 and/or the pivoting anvil 408. For instance, the handle 112 may be attached to the carrier 128, or anvil frame 462, via a pivot member 452 and pivot feature 454 interconnection. The pivot member 452 may correspond to a pin or cylindrical protrusion extending from a center of the stapler 400 to the left-hand side 150 and/or the right-hand side 160. This pin may interconnect with the pivot feature 454 in the handle body 414. The pivot feature 454 may be a hole disposed in, or through, a portion of the handle body 414 (e.g., arranged toward the rear 120 of the stapler 400). The hammer 156 may be affixed to the inside of the handle 112 (e.g., in the handle body 414, etc.) and move only when the handle 112 moves.

The stapler 400 may have various shapes, lengths, widths, heights, or other dimensions. For instance, the stapler 400 may possess a rectangular shape, and may be a "standard" stapler, a "half" stapler, or a "mini" stapler, as provided above. These dimensions are approximate and may change depending on a desired application for the stapler, design features, and user preferences. The shapes and dimensions of the stapler 400 described herein are in no way limited to the examples listed above.

The rotatable strike plate 416 may be rotated from a first staple forming position to a second staple forming position via rotating the body of the rotatable strike plate 416 about a center axis (e.g., about the Y-axis). In some embodiments, the rotatable strike plate 416 may locate into the first staple forming position and/or the second staple forming position via one or more detents. The rotatable strike plate 416 may include a number of features to allow a user to change the position of the rotatable strike plate 416 using only a single hand.

In some embodiments, the stapler 400 and/or the stapler 100 may include a staple storage tray 418 disposed in a portion of the handle 112. The handle 112 may comprise a handle body 414 and a handle upper 412. The handle body 414 may include a tray cavity 446 configured to receive the staple storage tray 418. The staple storage tray 418 may be inserted into the tray cavity 446 from a rear 120 of the stapler 400 through a tray aperture 444 disposed in the handle body 414. The staple storage tray 418 may include a staple storage cavity 428 configured to receive a group of staples 302. The group of staples 302 may be a full strip of staples, multiple strips of staples, and/or fractional strips of staples. In some embodiments, the staple storage tray 418 may include one or more staple grip recess areas 436 where a user can easily grasp a portion of the group of staples 302 stored inside the staple storage tray 418. The staple grip recess areas 436 may correspond to cutouts, or voids of material, disposed in sides of the staple storage tray 418.

In some embodiments, the staple storage tray 418 may extend from the rear 120 of the stapler 100. In one embodiment, the staple storage tray 418 may be retained at least partially in the handle body 414 such that the staple storage tray 418 cannot be removed completely from the handle body 414. In another embodiment, the staple storage tray 418 may be configured to be completely removeable from the handle body 414 and/or the tray cavity 446.

The staple storage tray 418 may include a docking protrusion 432 disposed at a front area of the tray 418 and a lip disposed at a rear area of the tray 418. The docking protrusion 432 may engage with a docking notch 442 disposed in the handle body 414. In some embodiments, the docking protrusion 432 may correspond to a tapered conical shaped feature (e.g., a conical frustum, etc.), a chamfered protrusion, a radiused protrusion, and/or other protrusion having at least one lead-in that guides the docking protrusion 432 into the docking notch 442. In one embodiment, the docking notch 442 may grasp the docking protrusion 432 (e.g., with an elastic member, elastic band, O-ring, and/or the like) holding the staple storage tray 418 in place inside the tray cavity 446. The lip may face a rear 120 of the stapler 400 and can be used to pull the staple storage tray 418 from a stored position to an extended position from the handle body 414.

Figure 5A:
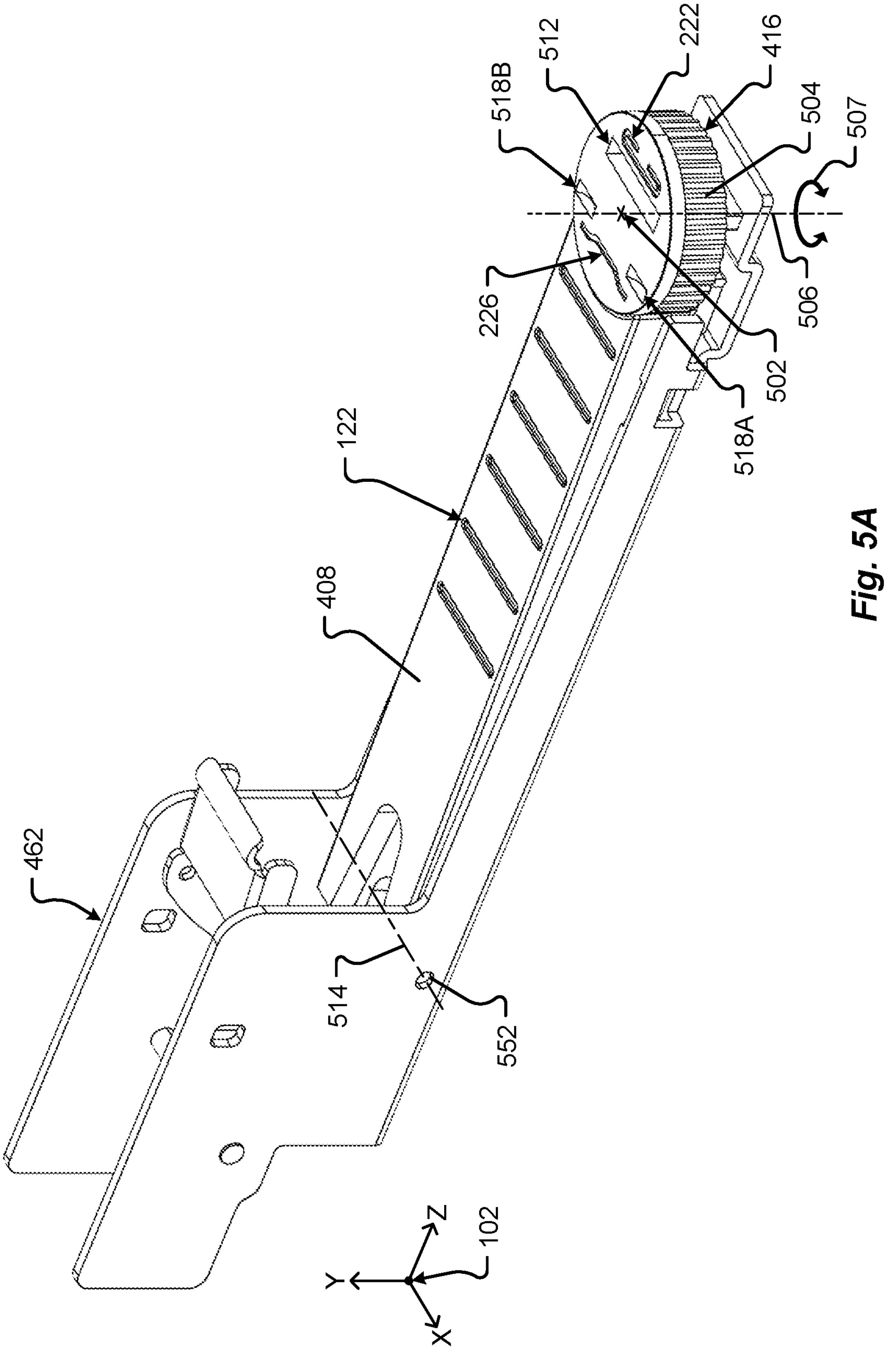
FIG. 5A shows a front perspective view of the anvil and frame of the stapler shown in FIG. 4A.
Figure 5B:
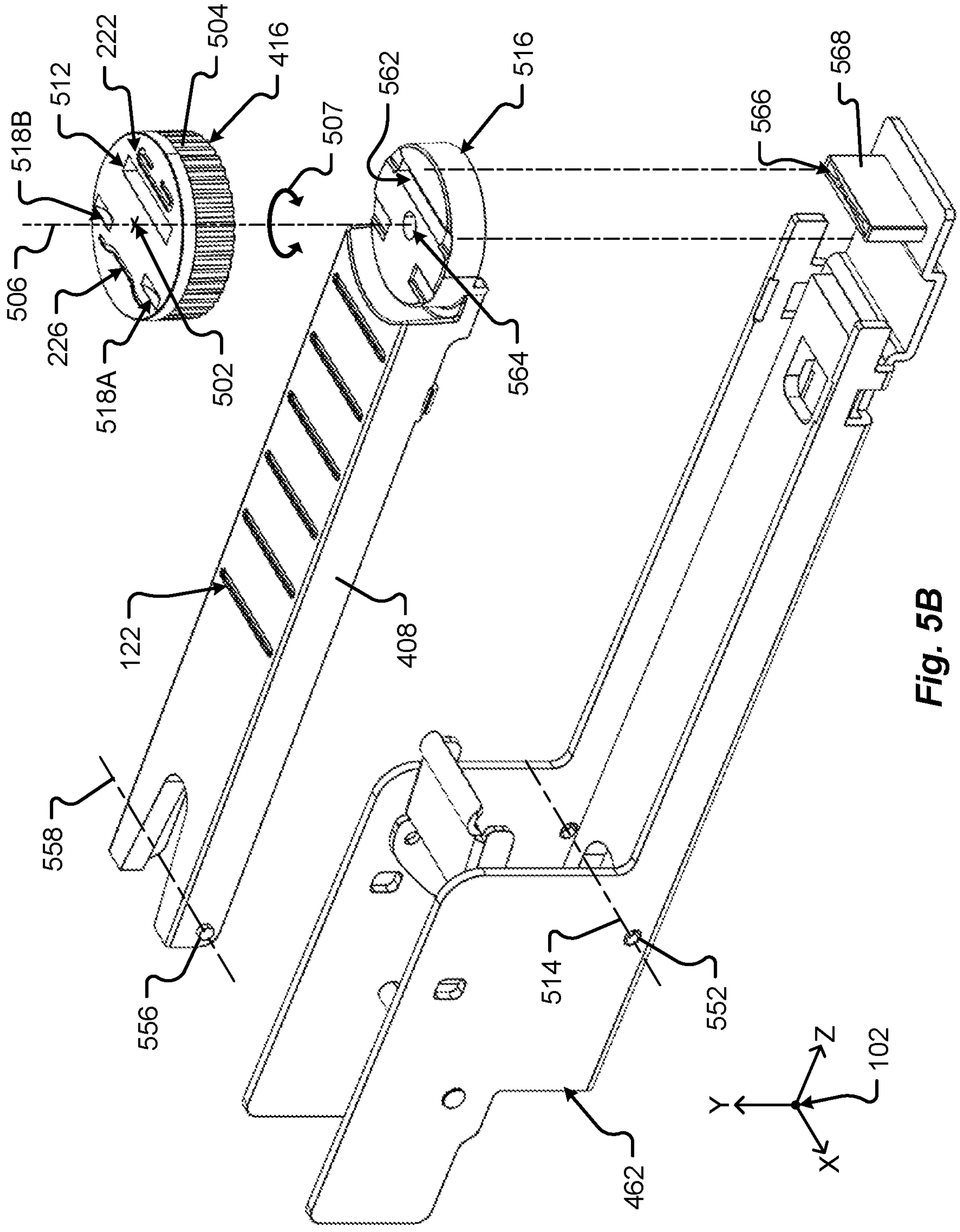
FIG. 5B shows an exploded front perspective view of the anvil and frame shown in FIG. 5A.

Referring now to FIGS. 5A-5B, front perspective views of the pivoting anvil 408, rotatable strike plate 416, and anvil frame 462 is shown in accordance with embodiments of the present disclosure. The other components of the stapler 400 are not shown in FIGS. 5A-5B for the sake of clarity in description. The anvil frame 462 may correspond to a metal frame that houses a portion of the pivoting anvil 408 and the rotatable strike plate 416. As shown in FIG. 5A, the pivoting anvil 408 may pivot relative to the anvil frame 462 about the anvil pivot axis 514. For instance, when the rotatable strike plate 416 is moved in the negative Y-axis direction (e.g., toward the bottom 130 of the stapler 400) the pivoting anvil 408 and the rotatable strike plate 416 may pivot from the anvil pivot axis 514 (e.g., at the frame pivot feature 552).

The rotatable strike plate 416 may be configured as a dial having a grip surface 504 disposed on an outer surface thereof. In some embodiments, the rotatable strike plate 416 may be cylindrical in shape. The rotatable strike plate 416 may include an inward staple clearance slot 512 (associated with a first staple forming position), and first and second leg outward staple forms 518A, 518B (associated with a second staple forming position). In some embodiments, the rotatable strike plate 416 may include an inward staple indicator 222 disposed adjacent to the inward staple form 212 and an outward staple indicator 226 disposed adjacent to the first and second leg outward staple forms 518A, 518B. The indicators 222, 226 may be etched, scored, machined, or marked on at least one surface of the rotatable strike plate 416.

The rotatable strike plate 416 may be moved between the first staple forming position and the second staple forming position by rotating the rotatable strike plate 416 about a rotation axis 506 running through the center 502 of the rotatable strike plate 416. The rotatable strike plate 416 may be rotated in a rotation direction 507 that is clockwise or counterclockwise. The grip surface 504 of the rotatable strike plate 416 may correspond to an interrupted surface such as, but in no way limited to, a knurled surface, a grooved surface, an undulated surface, a textured surface, and/or the like. In some embodiments, the grip surface 504 may include a grip material (e.g., rubber, adhesive, textile, etc.) that disposed on the periphery of the rotatable strike plate 416. In any event, the grip surface 504 allows a user to easily rotate the rotatable strike plate 416 from one position (e.g., first staple forming position) to another position (e.g., second staple forming position), or vice versa, using only a single hand.

As shown in the exploded front perspective view of FIG. 5B, the pivoting anvil 408 may include at least one anvil pivot pin 556 arranged on a pivot pin axis 558. The anvil pivot pin 556 may engage with the frame pivot feature 552 in the anvil frame 462. When connected, the anvil pivot axis 514 may be coincident with the pivot pin axis 558, providing an axis of rotation for the pivoting anvil 408 during operation. The pivoting anvil 408 may include a center hole 564 to receive a corresponding feature of the rotatable strike plate 416. The rotatable strike plate 416 may engage with the pivoting anvil 408 via the center hole 564 and/or the outer cylindrical surface 516. In one embodiment, the rotatable strike plate 416 may be retained to the pivoting anvil 408 via a shoulder screw, pin, or other fastener passing from the bottom of the pivoting anvil 408 through the center hole 564 and into the rotatable strike plate 416.

The pivoting anvil 408 may include one or more features that mate with features in the rotatable strike plate 416. For example, the clearance aperture 562 in the pivoting anvil 408 may mate with the inward staple clearance slot 512 when the rotatable strike plate 416 is arranged in the first staple forming position (e.g., aligned with the inward staple clearance slot 512). In this position, the inward staple forming block 568 may be disposed in the clearance aperture 562. The inward staple forming block 568 may include an inward staple forming area 566 disposed in an upper portion thereof. When the rotatable strike plate 416 is in the first staple forming position and the stapler 400 is actuated, the pivoting anvil 408 may pivot about the anvil pivot axis 514 and the inward staple forming block 568 may enter the clearance aperture 562 of the rotatable strike plate 416 to form a staple via the inward staple forming area 566. The rotatable strike plate 416 may be freely rotated while the pivoting anvil 408 is not pivoted downward (e.g., in the negative Y-axis direction). However, once the pivoting anvil 408 is pivoted downward (e.g., during operation), the rotatable strike plate 416 may be restricted from rotating by the inward staple forming block 568 disposed in the clearance aperture 562.

Figure 5C:
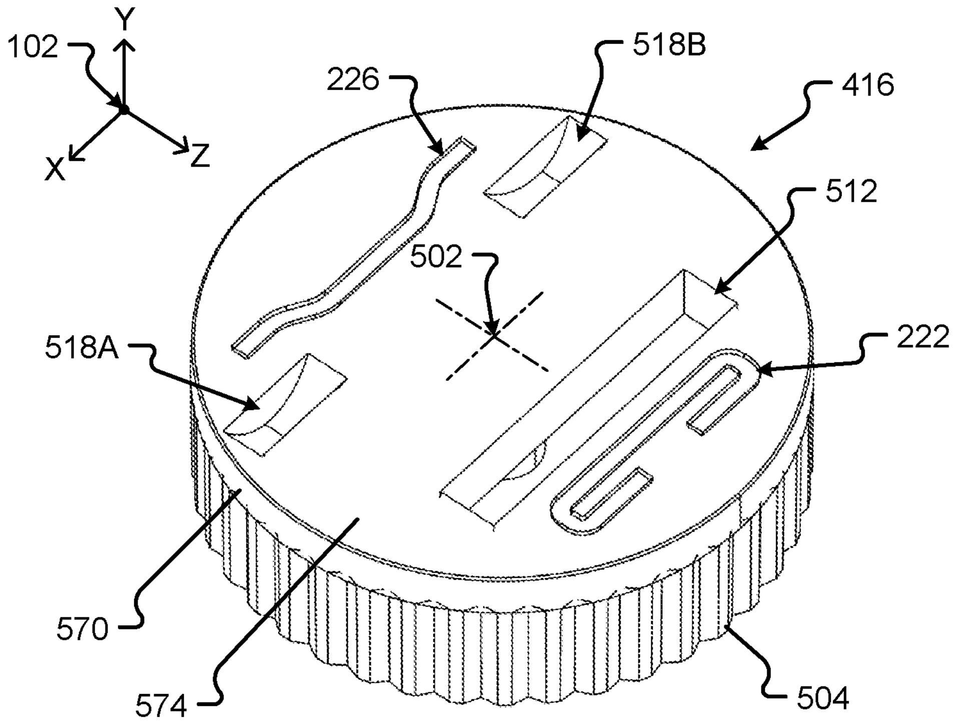
FIG. 5C shows a front perspective view of the rotatable strike plate in accordance with embodiments of the present disclosure.
Figure 5D:
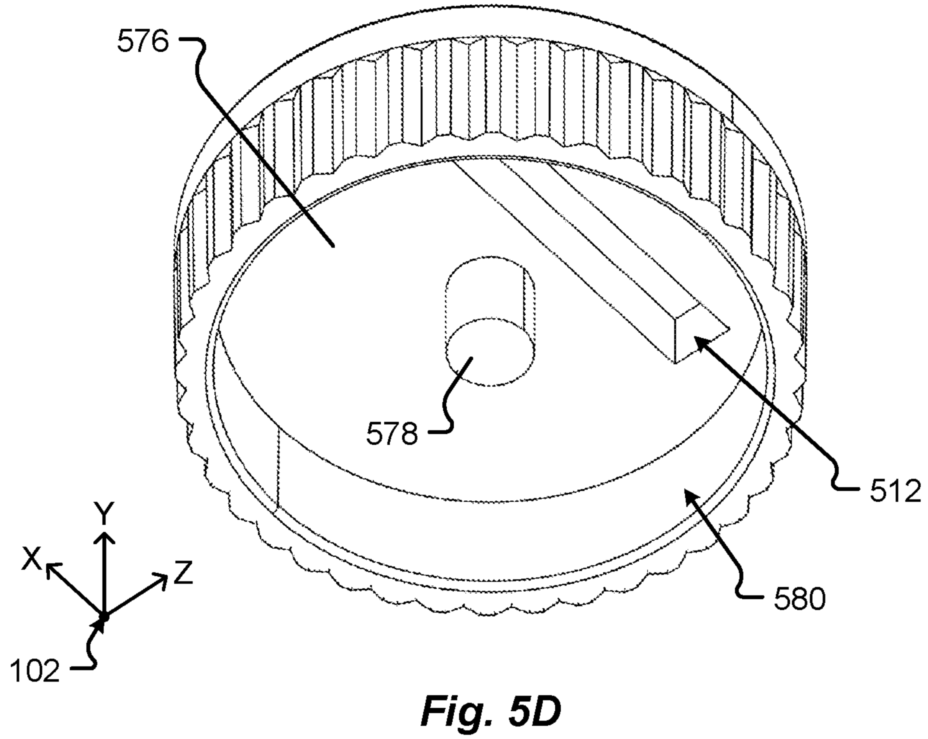
FIG. 5D shows a bottom front perspective view of the rotatable strike plate in accordance with embodiments of the present disclosure.

FIGS. 5C and 5D show various perspective views of the rotatable strike plate 416 in accordance with embodiments of the present disclosure. For instance, FIG. 5C shows a front perspective view of the rotatable strike plate 416 and FIG. 5D shows a bottom front perspective view of the rotatable strike plate 416. As provided above, the rotatable strike plate 416 may be configured as a dial body 570 comprising a grip surface 504 disposed on a peripheral surface of thereof. The rotatable strike plate 416 may include an upper surface 574 comprising the inward staple clearance slot 512, the first leg outward staple form 518A, the second leg outward staple form 518B, the inward staple indicator 222, and the outward staple indicator 226. In some embodiments, the grip surface 504 may extend from the upper surface 574 a distance in the negative Y-axis direction. This distance may define a height of the rotatable strike plate 416. As shown in FIG. 5D, the rotatable strike plate 416 may include a rotation pin 578 extending from the inner surface 576 of the dial body 570 (e.g., in the negative Y-axis direction). The rotation pin 578 may correspond to the protrusion of the rotatable strike plate 416 that interconnects with the center hole 564 of the pivoting anvil 408. A recessed area 580 may be disposed between the grip surface 504 and the rotation pin 578. In some embodiments, the recessed area 580 may define an inner rotational surface of the dial body 570 that fits with the outer cylindrical surface 516 of the pivoting anvil 408.

Figure 5E:
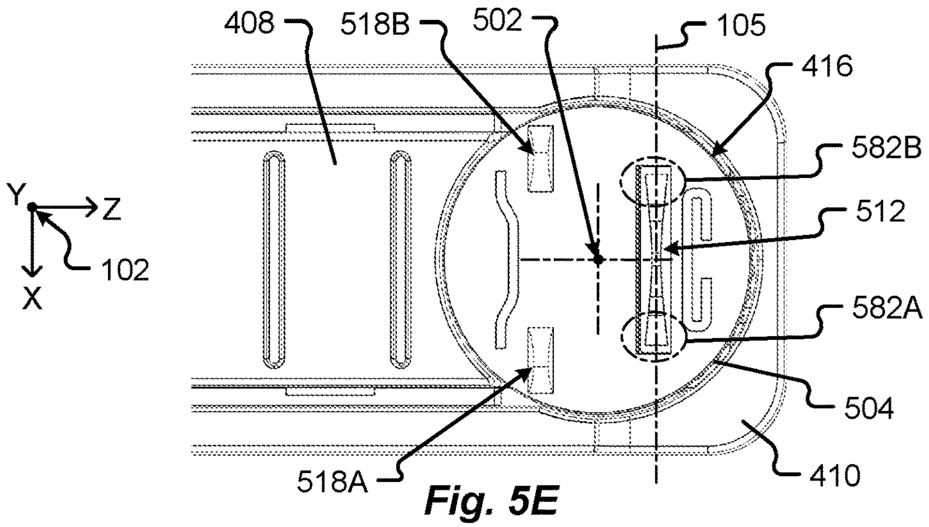
FIG. 5E shows a partial plan view of the rotatable strike plate of the stapler shown in FIG. 4A in a first staple forming position.
Figure 5F:
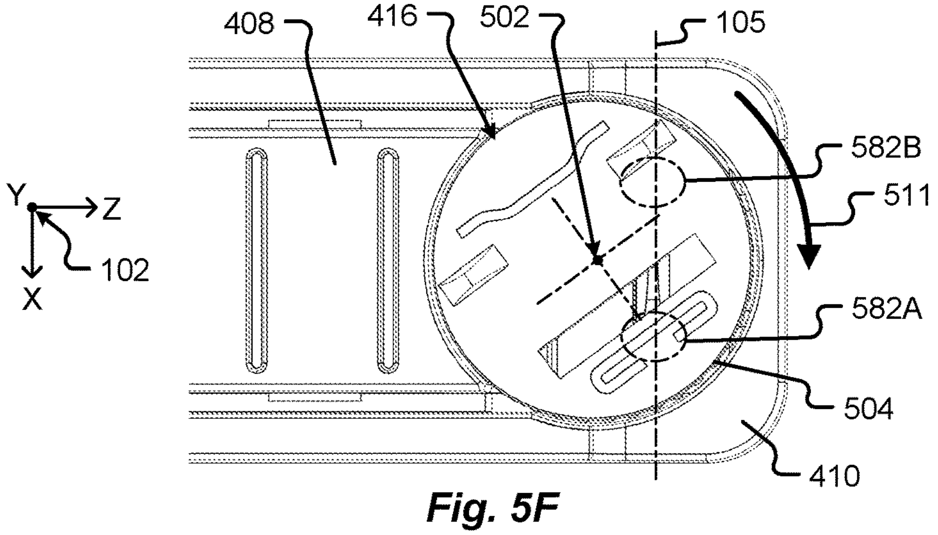
FIG. 5F shows a partial plan view of the rotatable strike plate of the stapler shown in FIG. 4A in an intermediate forming position rotating from the first staple forming position to a second staple forming position.
Figure 5G:
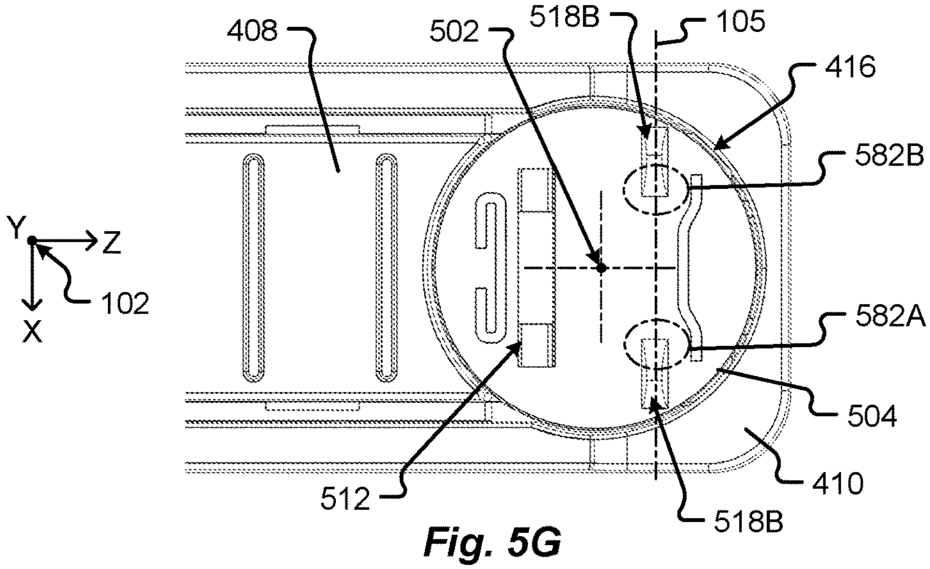
FIG. 5G shows a partial plan view of the rotatable strike plate of the stapler shown in FIG. 4A in the second staple forming position.

FIGS. 5E-5G show partial plan views of the rotatable strike plate 416 moving from a first staple forming position to a second staple forming position. The stapler 400 may be configured to eject staples from the staple ejection area 136 toward the rotatable strike plate 416. More specifically, as a staple is ejected from the carrier 128, the legs of the staple may be directed to a first leg strike zone 582A and a second leg strike zone 582B. The position of the leg strike zones 582A, 582B do not change relative to the pivot axis 114. The leg strike zones 582A, 582B define the areas where the staples are ejected from the stapler 400. The leg strike zones 582A, 582B are disposed in the stapling plane 105, which is a fixed plane relative to the front 110, rear 120, and/or the pivot axis 114 of the stapler 400.

FIG. 5E shows the rotatable strike plate 416 in the first staple forming position. In this position, the features of the inward staple forming area 566 of the inward staple forming block 568 are positioned beneath the inward staple clearance slot 512. When the stapler 400 is actuated in this position, the staple is ejected toward the inward staple forming area 566, the pivoting anvil 408 pivots downward, and the staple is formed into the inwardly crimped staple 202A by the inward staple forming area 566 of the inward staple forming block 568.

FIG. 5F shows the rotatable strike plate 416 being turned in a clockwise rotation direction 511 about a center 502 of the rotatable strike plate 416. The rotatable strike plate 416 can be turned or rotated while the pivoting anvil 408 is unpivoted. As shown in FIG. 5F, the position of the leg strike zones 582A, 582B do not move when the rotatable strike plate 416 is rotated. As provided above, a user can rotate the rotatable strike plate 416 with one hand engaging the grip surface 504 of the rotatable strike plate 416 and turning the rotatable strike plate 416 about the rotation axis 506 in a clockwise or counterclockwise rotational direction. In FIG. 5F, the rotatable strike plate 416 is being turned in the clockwise rotation direction 511.

FIG. 5G shows the rotatable strike plate 416 turned 180 degrees from the position shown in FIG. 5E. In this position, the second leg outward staple form 518B and the first leg outward staple form 518A are oriented in the first and second leg strike zones 582A, 582B, respectively. When the stapler 400 is actuated in this position, the staple is ejected toward the outward staple forms 518A, 518B and the staple is formed into the outwardly crimped staple 202B. As shown in FIG. 5G, the position of the leg strike zones 582A, 582B do not move when the rotatable strike plate 416 is rotated.

Figure 6A:
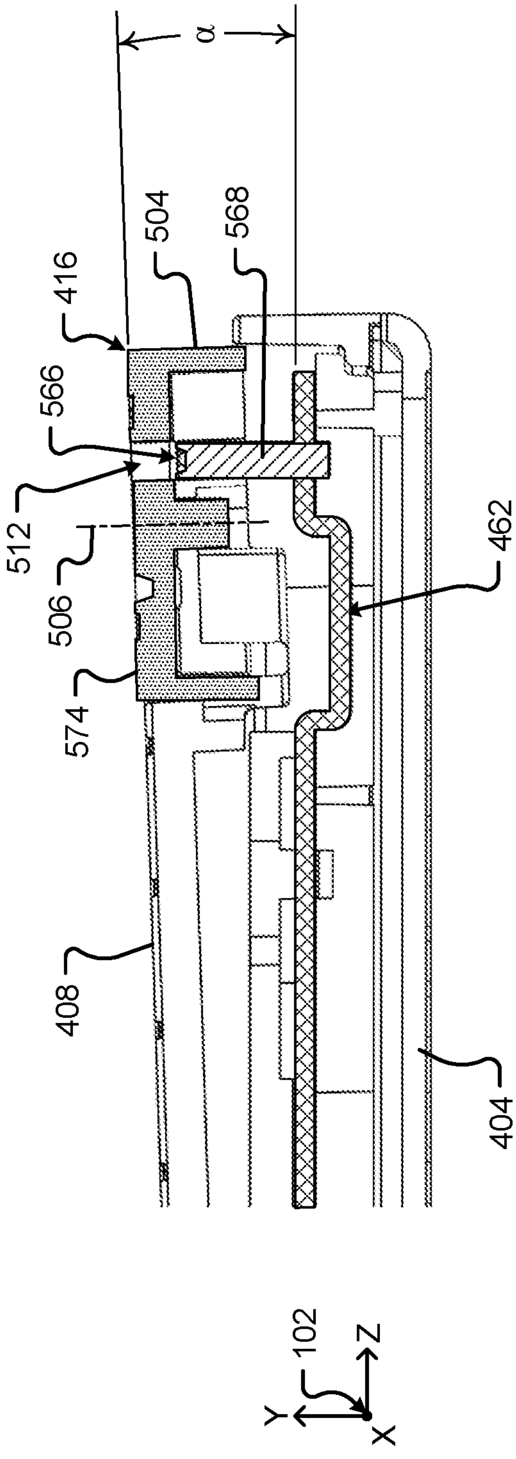
FIG. 6A shows a section elevation view of the rotatable strike plate and anvil of the stapler shown in FIG. 4A in an unactuated position.
Figure 6B:
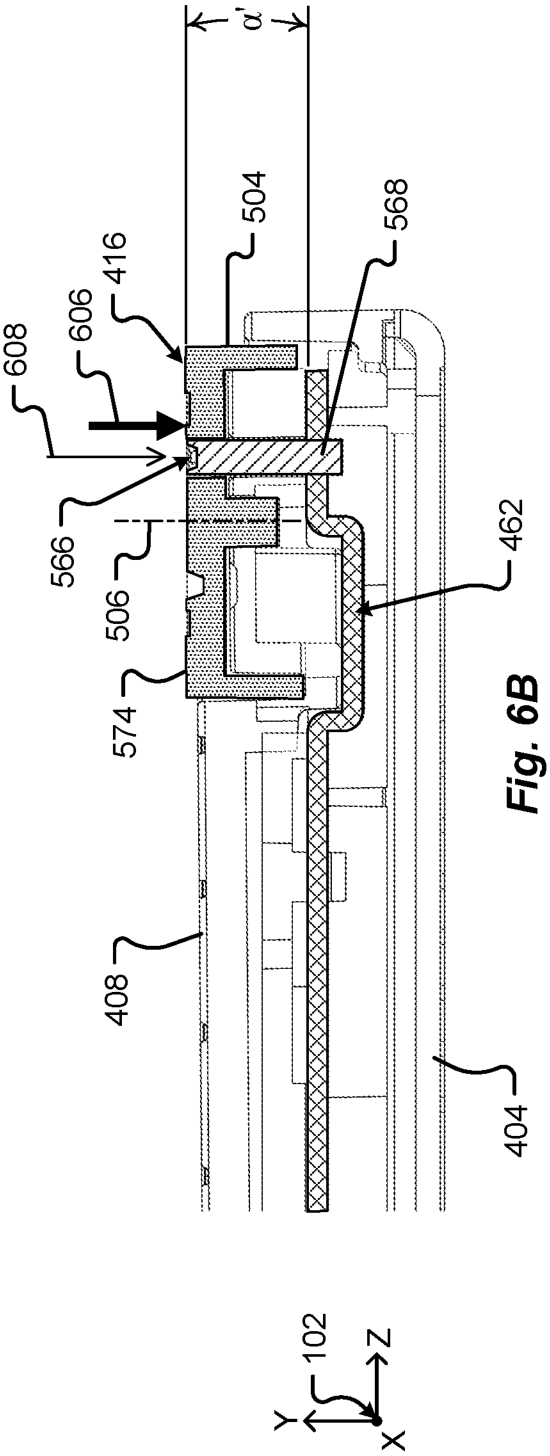
FIG. 6B shows a section elevation view of the rotatable strike plate and anvil of the stapler shown in FIG. 4A in an actuated position.

FIGS. 6A-6B show section elevation views of the rotatable strike plate 416 in the first staple forming position as the pivoting anvil 408 is pivoted downward during a stapling operation. As shown in FIG. 6A, prior to stapling, the rotatable strike plate 416 is shown disposed at an angle, a, relative to the bottom surface of the anvil frame 462 and/or the base 403. This angle, a, may correspond to a nonzero angle between 1 degree and 15 degrees. In this pre-stapling position, the rotatable strike plate 416 may be freely rotated about the rotation axis 506 in the center 502 of the rotatable strike plate 416. The inward staple forming block 568 is disposed beneath the inward staple clearance slot 512 in the rotatable strike plate 416.

Once the stapler 400 is actuated in the first staple forming position, a contact force 606 may move the pivoting anvil 408 to pivot about the anvil pivot axis 514, as shown in FIG. 6B. In this pivoted position, a staple may follow the staple leg forming line 608 toward the inward staple forming area 566 in the inward staple forming block 568. The inward staple forming block 568 is disposed in the inward staple clearance slot 512 and may be flush or close to flush with the upper surface 574 of the rotatable strike plate 416. In some embodiments, the upper surface 574 of the rotatable strike plate 416 may be substantially parallel relative to the bottom surface of the anvil frame 462 and/or the base 403. In some embodiments, the angle, a', may correspond to an angle less than 1 degree.

The exemplary devices, assemblies, and systems of this disclosure have been described in relation to a stapler with a moveable anvil. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

References in the specification to "one embodiment," "an embodiment," "an example embodiment," "an exemplary embodiment," "some embodiments," "an aspect," etc., indicate that the embodiment described may include a particular feature, structure, step, or characteristic, but every embodiment may not necessarily include the particular feature, structure, step or characteristic as one or more of the particular features, structures, steps, or characteristics may be optional depending, for example, on a particular implementation or operational environment. Moreover, such phrases are not necessarily referring to the same embodiment. Further, when a particular feature, structure, step, or characteristic is described in conjunction with one embodiment, it is submitted that the description of such feature, structure, step or characteristic may apply to any one or more of the other embodiments described herein.

A number of variations and modifications of the disclosure can be used. It would be possible to provide for some features of the disclosure without providing others.

The present disclosure, in various aspects, embodiments, and/or configurations, includes components, methods, processes, systems and/or apparatus substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

Embodiments include a stapler, comprising: a base extending a length from a front of the stapler to a rear of the stapler, the base comprising a stapling plane offset from the front of the staple, the stapling plane defining a staple ejection path; a handle that moves relative to the base from a first position to a second position, the handle comprising a staple ejection area arranged in the stapling plane; and a strike plate attached to the base at the front of the stapler and slidably moveable between a first staple forming position and a second staple forming position, the strike plate comprising: a first staple forming recess disposed in a body of the strike plate and arranged in a first forming plane parallel to the stapling plane; and a second staple forming recess disposed in the body of the strike plate and arranged in a second forming plane parallel to and offset a distance from the first forming plane; wherein, in the first staple forming position, the first staple forming recess is arranged in the stapling plane, and wherein, in the second staple forming position, the second staple forming recess is arranged in the stapling plane.

Aspects of the above stapler include wherein a portion of the strike plate extends beyond the front of the stapler in the second staple forming position, and wherein the strike plate linearly displaces the distance while remaining in contact with a portion of the base when moving between the first staple forming position and the second staple forming position. Aspects of the above stapler include wherein the first staple forming recess forms a staple ejected along the staple ejection path into an inwardly clinching form, and wherein the second staple forming recess forms the staple ejected along the staple ejection path into an outwardly clinching form. Aspects of the above stapler include wherein the strike plate comprises a grip feature disposed on at least one side of the body of the strike plate. Aspects of the above stapler include wherein the first staple forming recess and the second staple forming recess are disposed in an upper surface of the body of the strike plate, wherein a first staple indicator defining a shape of an inwardly clinching staple is arranged adjacent to the first staple forming recess, and wherein a second staple indicator defining a shape of an outwardly clinching staple is arranged adjacent to the second staple forming recess. Aspects of the above stapler include wherein the second staple forming recess comprises two separate forming recesses arranged in-line and separated from one another by a width distance. Aspects of the above stapler include wherein the first staple forming recess and the second staple forming recess are disposed in an upper surface of the body of the strike plate, wherein the strike plate comprises an inner surface of the body disposed opposite the upper surface of the body, and wherein the strike plate comprises a sliding travel stop protruding from the inner surface of the body in a direction toward the base of the stapler. Aspects of the above stapler include wherein the sliding travel stop is arranged in an aperture disposed in the base of the stapler, wherein the sliding travel stop contacts a first surface of the aperture in the first staple forming position, wherein the sliding travel stop contacts an opposite second surface of the aperture in the second staple forming position. Aspects of the above stapler include wherein a detent spring is slidably mounted to the base and interconnected to the sliding travel stop, wherein the detent spring comprises a detent feature that locates on one side of a protrusion in the base in the first staple forming position and locates on an opposite side of the protrusion in the base in the second staple forming position. Aspects of the above stapler include wherein a carrier is disposed at least partially within the handle, and wherein the carrier comprises: a U-shaped channel comprising a staple receiving cavity configured to receive a plurality of staples; and an indicator window disposed in a sidewall of the U-shaped channel, the indicator window passing through the sidewall of the U-shaped channel and into the staple receiving cavity, wherein a pusher is visible in the indicator window when the plurality of staples disposed in the staple receiving cavity are equal to or fewer than a specific number of staples in the plurality of staples, and wherein the pusher is not visible in the indicator window when the plurality of staples disposed in the staple receiving cavity are greater than the specific number of staples in the plurality of staples.

Embodiments include a stapling device having a width running a length from a first end of the stapling device to an opposite second end of the stapling device, the stapling device comprising: a base running the length of the stapling device and comprising a stapling plane offset from the first end of the stapling device in a direction toward the second end of the stapling device, the stapling plane arranged orthogonal to the width of the stapling device and defining a path that staples follow when ejected from the stapling device; a carrier frame disposed within and fixedly attached to a portion of the base, the carrier frame pivotally supporting a staple carrier, the staple carrier comprising a staple ejection area disposed in the stapling plane; a handle pivotally attached to the carrier frame and pivotally, wherein the handle and the staple carrier pivotally move between an unactuated and an actuated state relative to the base; and a strike plate attached to the base at the first end of the stapling device, the strike plate comprising: a first staple forming recess disposed in a body of the strike plate and arranged in a first forming plane parallel to the stapling plane; and a second staple forming recess disposed in the body of the strike plate and arranged in a second forming plane parallel to and offset a distance from the first forming plane; wherein the strike plate is slidably moveable between a first staple forming position and a second staple forming position, wherein, in the first staple forming position, the first staple forming recess is disposed in the stapling plane and the second staple forming recess is disposed outside of the stapling plane, and wherein, in the second staple forming position, the second staple forming recess is disposed in the stapling plane and the first staple forming recess is disposed outside of the stapling plane.

Aspects of the above stapling device include wherein the strike plate is linearly displaced a distance running along the length of the stapling device between the first staple forming position and the second staple forming position, and wherein a portion of the strike plate extends beyond the first end of the stapling device in the second staple forming position. Aspects of the above stapling device include wherein the strike plate remains in contact with the base when linearly displaced between the first staple forming position and the second staple forming position.

Aspects of the above stapling device include wherein the first staple forming recess forms a staple ejected along the staple ejection path into an inwardly clinching staple, and wherein the second staple forming recess forms the staple ejected along the staple ejection path into an outwardly clinching staple. Aspects of the above stapling device include wherein the strike plate comprises dimple grip features disposed on opposing sides of the body of the strike plate. Aspects of the above stapling device include wherein the first staple forming recess and the second staple forming recess are disposed in an upper surface of the body of the strike plate, wherein a first staple indicator in a shape of the inwardly clinching staple is arranged adjacent to the first staple forming recess, and wherein a second staple indicator in a shape of the outwardly clinching staple is arranged adjacent to the second staple forming recess. Aspects of the above stapling device include wherein the second staple forming recess comprises two separate forming recesses arranged in-line and separated from one another by a width distance running along the width of the stapling device. Aspects of the above stapling device include wherein the staple carrier comprises a U-shaped channel comprising a staple receiving cavity configured to receive a plurality of staples, and wherein an indicator window is disposed in at least one sidewall of the U-shaped channel, the indicator window passing through the sidewall of the U-shaped channel and into the staple receiving cavity, wherein a pusher of the stapling device is visible in the indicator window when the plurality of staples disposed in the staple receiving cavity are equal to or fewer than a specific number of staples in the plurality of staples, and wherein the pusher is not visible in the indicator window when the plurality of staples disposed in the staple receiving cavity are greater than the specific number of staples in the plurality of staples.

Embodiments include a stapler, comprising: a base extending a length from a front of the stapler to a rear of the stapler, the base comprising a stapling plane offset from the front of the staple and disposed orthogonally to the length of the base, the stapling plane defining a staple ejection path that staples follow when ejected from the stapler; a handle that pivots relative to the base from a first unactuated position to a second actuated position, the handle comprising a staple ejection area arranged in the stapling plane; and a strike plate attached to the base at the front of the stapler and slidably moveable between a first staple forming position and a second staple forming position, the strike plate comprising: a first staple forming recess disposed in a body of the strike plate and arranged in a first forming plane parallel to the stapling plane, the first staple forming recess arranged in the stapling plane in the first staple forming position and not in the second staple forming position; and a second staple forming recess disposed in the body of the strike plate and arranged in a second forming plane parallel to and offset a distance from the first forming plane, the second staple forming recess arranged in the stapling plane in the second staple forming position and not in the first staple forming position.

Aspects of the above stapler include wherein a portion of the strike plate extends, in a direction from the rear of the stapler toward the front of the stapler, past the front of the stapler in the second staple forming position, wherein the strike plate linearly displaces the distance while remaining in contact with a portion of the base when moving between the first staple forming position and the second staple forming position, wherein the first staple forming recess forms a staple ejected along the staple ejection path into an inwardly clinching form, wherein the second staple forming recess forms the staple ejected along the staple ejection path into an outwardly clinching form, and wherein the strike plate comprises a grip feature disposed on at least one side of the body of the strike plate.

Any one or more of the aspects/embodiments as substantially disclosed herein.

Any one or more of the aspects/embodiments as substantially disclosed herein optionally in combination with any one or more other aspects/embodiments as substantially disclosed herein.

One or more means adapted to perform any one or more of the above aspects/embodiments as substantially disclosed herein.

The phrases “at least one,” “one or more,” “or,” and “and/or” are open-ended expressions that are both conjunctive and disjunctive in operation. For example, each of the expressions “at least one of A, B and C,” “at least one of A, B, or C,” “one or more of A, B, and C,” “one or more of A, B, or C,” “A, B, and/or C,” and “A, B, or C” means A alone, B alone, C alone, A and B together, A and C together, B and C together, or A, B and C together.

The term “a” or “an” entity refers to one or more of that entity. As such, the terms “a” (or “an”), “one or more,” and “at least one” can be used interchangeably herein. It is also to be noted that the terms “comprising,” “including,” and “having” can be used interchangeably.

The term “means” as used herein shall be given its broadest possible interpretation in accordance with 35 U.S.C., Section 112, Paragraph 6. Accordingly, a claim incorporating the term “means” shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

What is claimed is:

1. A stapler, comprising:

a base extending from a front of the stapler to a rear of the stapler, the base comprising a stapling plane offset from the front of the stapler, the stapling plane defining a staple ejection path;

a handle that moves relative to the base from a first position to a second position, the handle comprising a staple ejection area arranged in the stapling plane;

a staple forming block attached to the base and extending in a direction toward the handle, wherein the staple forming block is disposed at least partially in the stapling plane; and a dial attached to the base at the front of the stapler, the dial rotatably moveable between a first staple forming position and a second staple forming position, the dial comprising:

a body comprising a cylindrical outer shape extending a height of the dial from a first end of the body to a second end of the body, wherein an upper surface of the body is disposed within a periphery of the cylindrical outer shape at the first end of the body, and wherein a recessed area extends into the body from the second end of the body in a direction toward the first end of the body;

an inward staple clearance slot extending through the upper surface of the body and into the recessed area, wherein the inward staple clearance slot is arranged in the stapling plane when the dial is in the first staple forming position, and wherein the inward staple clearance slot is arranged outside of the stapling plane when the dial is in the second staple forming position; and an outward staple forming recess disposed in the upper surface of the body, the outward staple forming recess offset a distance from the inward staple clearance slot, wherein the outward staple forming recess is arranged in the stapling plane when the dial is in the second staple forming position, and wherein the outward staple forming recess is arranged outside of the stapling plane, when the dial is in the first staple forming position.

2. The stapler of claim 1, wherein the dial comprises a textured surface disposed on an outer peripheral surface along at least a portion of the height of the dial between the first end of the body and the second end of the body.

3. The stapler of claim 2, wherein a portion of the textured surface remains extended above the base when the dial is in the first staple forming position, when the dial is in the second staple forming position, and when the dial is in between the first staple forming position and the second staple forming position.

4. The stapler of claim 1, wherein the first staple forming position and the second staple forming position are arranged 180 degrees apart from one another, and wherein the dial is rotatably moveable about a center of the dial between the first staple forming position and the second staple forming position.

5. The stapler of claim 1, wherein the inward staple clearance slot is configured to receive a portion of the staple forming block when the dial is in the first staple forming position, and wherein the outward staple forming recess and the upper surface of the body covers the staple forming block when the dial is in the second staple forming position.

6. The stapler of claim 5, wherein the staple forming block comprises an inward staple forming area disposed in an upper portion of the staple forming block, and wherein the inward staple forming area is configured to contact and form two legs of a staple emitted from the staple ejection area along the staple ejection path through the inward staple clearance slot into an inwardly clinching form, such that the two legs of the staple face inwardly toward one another, when the dial is in the first staple forming position.

7. The stapler of claim 5, wherein the outward staple forming recess is configured to contact and form two legs of a staple emitted from the staple ejection area along the staple ejection path into an outwardly clinching form, such that the two legs of the staple face outwardly away from one another, when the dial is in the second staple forming position.

8. The stapler of claim 1, wherein a first staple indicator defining a shape of an inwardly clinching staple is arranged adjacent to the inward staple clearance slot, and wherein a second staple indicator defining a shape of an outwardly clinching staple is arranged adjacent to the outward staple forming recess.

9. The stapler of claim 1, wherein a carrier is disposed at least partially within the handle, and wherein the carrier comprises:

a U-shaped channel comprising a staple receiving cavity configured to receive a plurality of staples; and an indicator window disposed in a sidewall of the U-shaped channel, the indicator window passing through the sidewall of the U-shaped channel and into the staple receiving cavity, wherein a pusher is visible in the indicator window when the plurality of staples disposed in the staple receiving cavity are equal to or fewer than a specific number of staples in the plurality of staples, and wherein the pusher is not visible in the indicator window when the plurality of staples disposed in the staple receiving cavity are greater than the specific number of staples in the plurality of staples.

10. A stapling device having a width running a length from a first end of the stapling device to an opposite second end of the stapling device, the stapling device comprising:

a base running the length of the stapling device and comprising a stapling plane offset from the first end of the stapling device in a direction toward the second end of the stapling device, the stapling plane arranged orthogonal to the width of the stapling device and defining a path that staples follow when ejected from the stapling device;

a carrier frame attached to a portion of the base, the carrier frame pivotally supporting a staple carrier, the staple carrier comprising a staple ejection area disposed in the stapling plane;

a handle pivotally attached to the carrier frame, wherein the handle and the staple carrier pivotally move between an unactuated and an actuated state relative to the base;

a staple forming block disposed at least partially in the stapling plane and attached to the base, wherein the staple forming block extends in a direction toward the carrier frame; and a dial attached to the base adjacent the first end of the stapling device, the dial rotatably moveable between a first staple forming position and a second staple forming position, the dial comprising:

a cylindrical body comprising a first end surface and a second end surface disposed opposite the first end surface, wherein a recess extends into the cylindrical body from the second end surface in a direction toward the first end surface;

an inward staple clearance slot extending through the first end surface and into the recess, wherein the inward staple clearance slot is arranged in the stapling plane when the dial is in the first staple forming position, and wherein the inward staple clearance slot is arranged outside of the stapling plane, when the dial is in the second staple forming position; and a pair of outward staple forming recesses disposed in the first end surface of the cylindrical body, the pair of outward staple forming recesses offset a distance from the inward staple clearance slot, wherein the pair of outward staple forming recesses are arranged in the stapling plane when the dial is in the second staple forming position, and wherein the pair of outward staple forming recesses are arranged outside of the stapling plane when the dial is in the first staple forming position.

11. The stapling device of claim 10, wherein the cylindrical body comprises a textured surface portion extending around a periphery of the cylindrical body.

12. The stapling device of claim 11, wherein a grip section of the textured surface portion remains uncovered on a first width side and a second width of the stapling device when the dial is in the first staple forming position and when the dial is in the second staple forming position.

13. The stapling device of claim 10, wherein the inward staple clearance slot is configured to receive a portion of the staple forming block when the dial is in the first staple forming position and when the handle and the staple carrier are moved into the actuated state, and wherein the first end surface covers the staple forming block when the dial is in the second staple forming position.

14. The stapling device of claim 13, wherein the staple forming block comprises an inward staple forming area disposed in an upper portion of the staple forming block, and wherein the inward staple forming area is configured to contact and form two legs of a staple ejected from the stapling device along the path through the inward staple clearance slot into an inwardly clinching form, such that the two legs of the staple face inwardly toward one another, when the dial is in the first staple forming position and when the handle and the staple carrier are moved into the actuated state.

15. The stapling device of claim 13, wherein the pair of outward staple forming recesses are configured to form two legs of a staple ejected from the stapling device along the path into an outwardly clinching form, such that the two legs of the staple face outwardly away from one another, when the dial is in the second staple forming position and when the handle and the staple carrier are moved into the actuated state.

16. The stapling device of claim 10, wherein the staple carrier comprises a U-shaped channel comprising a staple receiving cavity configured to receive a plurality of staples, and wherein an indicator window is disposed in at least one sidewall of the U-shaped channel, the indicator window passing through the at least one sidewall of the U-shaped channel and into the staple receiving cavity, wherein a pusher of the stapling device is visible in the indicator window when the plurality of staples disposed in the staple receiving cavity are equal to or fewer than a specific number of staples in the plurality of staples, and wherein the pusher is not visible in the indicator window when the plurality of staples disposed in the staple receiving cavity are greater than the specific number of staples in the plurality of staples.

17. A stapler, comprising:

a base extending from a front of the stapler to a rear of the stapler, the base comprising a stapling plane offset from the front of the stapler, the stapling plane defining a staple ejection path;

a carrier frame attached to a portion of the base, the carrier frame pivotally supporting a staple carrier, the staple carrier comprising a staple ejection area disposed in the stapling plane;

a handle pivotally attached to the carrier frame, wherein the handle and the staple carrier pivotally move between an unactuated and an actuated state relative to the base, wherein the handle comprises a tray cavity extending a cavity length from an aperture disposed in the handle adjacent the rear of the stapler into the handle;

a staple storage tray comprising a staple storage cavity, the staple storage tray slidably engaged with the tray cavity, wherein the staple storage tray is moveable between a stored position, where the staple storage cavity of the staple storage tray is disposed inside the handle, and an extended position, where the staple storage cavity of the staple storage tray is disposed at least partially outside of the handle;

a dial attached to the base at the front of the stapler, the dial rotatably moveable between a first staple forming position and a second staple forming position, the dial comprising:

a cylindrical body comprising a first end surface and a second end surface disposed opposite the first end surface, wherein a recess extends into the cylindrical body from the second end surface in a direction toward the first end surface;

an inward staple clearance slot extending through the first end surface and into the recess, wherein the inward staple clearance slot is arranged in the stapling plane when the dial is in the first staple forming position, and wherein the inward staple clearance slot is arranged outside of the stapling plane, when the dial is in the second staple forming position; and a pair of outward staple forming recesses disposed in the first end surface of the cylindrical body, the pair of outward staple forming recesses offset a distance from the inward staple clearance slot, wherein the pair of outward staple forming recesses are arranged in the stapling plane when the dial is in the second staple forming position, and wherein the pair of outward staple forming recesses are arranged outside of the stapling plane when the dial is in the first staple forming position;

a first group of staples disposed inside the staple carrier; and a second group of staples disposed inside the staple storage cavity of the staple storage tray, wherein the first group of staples are separate from the second group of staples.

18. The stapler of claim 17, wherein a first staple indicator defining a shape of an inwardly clinching staple is arranged adjacent to the inward staple clearance slot, and wherein a second staple indicator defining a shape of an outwardly clinching staple is arranged adjacent to the pair of outward staple forming recesses.

19. The stapler of claim 17, further comprising:

a staple forming block disposed at least partially in the stapling plane and attached to the base, wherein the staple forming block extends in a direction toward the carrier frame.

20. The stapler of claim 17, wherein the staple carrier comprises:

an indicator window disposed in a sidewall of the staple carrier, the indicator window passing through the sidewall of the staple carrier, wherein a pusher is visible in the indicator window when the first group of staples disposed inside the staple carrier are equal to or fewer than a specific number of staples in the first group of staples, and wherein the pusher is not visible in the indicator window when the first group of staples disposed in the staple carrier are greater than the specific number of staples in the first group of staples.

* * * * *